US012559988B2

(12) United States Patent
Arlinghaus et al.

(10) Patent No.: US 12,559,988 B2
(45) Date of Patent: Feb. 24, 2026

(54) EXIT DEVICE ASSEMBLY

(71) Applicant: Schlage Lock Company LLC, Carmel, IN (US)

(72) Inventors: Paul R. Arlinghaus, Fishers, IN (US); Jack R. Lehner, Indianapolis, IN (US); Suraj Kumbhar, Karnataka (IN); Chad Eagin, Carmel, IN (US); Eric Hoiland, Carmel, IN (US)

(73) Assignee: Schlage Lock Company LLC, Carmel, IN (US)

( * ) Notice: Subject to any disclaimer, the term of this patent is extended or adjusted under 35 U.S.C. 154(b) by 65 days.

(21) Appl. No.: 18/623,663

(22) Filed: Apr. 1, 2024

(65) Prior Publication Data

US 2024/0328208 A1 Oct. 3, 2024

Related U.S. Application Data

(60) Provisional application No. 63/493,851, filed on Apr. 3, 2023.

(51) Int. Cl.
*E05B 65/10* (2006.01)

(52) U.S. Cl.
CPC ...... *E05B 65/1086* (2013.01); *E05B 65/1053* (2013.01)

(58) Field of Classification Search
CPC ............. E05B 65/1086; E05B 65/1053; E05B 65/1046; E05B 65/1093; E05B 13/002; E05B 41/00; E05B 17/20; E05B 9/08; E05B 67/00; E05B 2047/0084; E05B 55/06; E05B 3/065; E05B 47/0657; E05B 47/023; E05B 15/04; E05B 63/18; Y10T 70/7102; Y10T 70/8446; Y10T 70/5159; Y10T 70/5832;
(Continued)

(56) References Cited

U.S. PATENT DOCUMENTS

| | | | | | |
|---|---|---|---|---|---|
| 1,815,584 | A * | 7/1931 | Prinzler | E05B 65/1066 | 70/210 |
| 2,724,258 | A * | 11/1955 | Mcconnell | E05B 65/1066 | 70/92 |

(Continued)

FOREIGN PATENT DOCUMENTS

| | | | | |
|---|---|---|---|---|
| TW | M534767 U * | 1/2017 | | E05B 45/06 |
| WO | 2020028676 A1 | 2/2020 | | |
| WO | 2021113493 A2 | 6/2021 | | |

OTHER PUBLICATIONS

Extended European Search Report; European Patent Office; European Application No. 24168339.0; Sep. 18, 2024; 7 pages.

*Primary Examiner* — Steven A Tullia
(74) *Attorney, Agent, or Firm* — Taft Stettinius & Hollister LLP

(57) ABSTRACT

An exit device assembly is provided in which the exterior trim can be locked and unlocked from an interior lock cylinder assembly on the interior side of the door and from an exterior lock cylinder assembly on an exterior side of the door. The interior lock cylinder assembly is located on a center case of the pushbar assembly, and the exterior lock cylinder assembly is located on the exterior trim. The interior lock cylinder assembly is operable to transition the exterior trim between a locked state and an unlocked state, and the exterior lock cylinder assembly is operable to lock and unlock the exterior trim.

20 Claims, 16 Drawing Sheets

(58) Field of Classification Search
CPC ............. Y10T 70/577; Y10T 292/0908; Y10T 292/57; Y10T 292/0822; Y10S 70/60
USPC ................... 70/92, 210, 107, 224, 485, 467; 292/336.3, 21, 92
See application file for complete search history.

(56) References Cited

U.S. PATENT DOCUMENTS

| | | | | |
|---|---|---|---|---|
| 3,271,982 | A * | 9/1966 | Welch | E05B 65/1066 70/92 |
| 5,412,961 | A * | 5/1995 | Cain | E05B 63/0065 70/92 |
| 7,501,930 | B2 * | 3/2009 | Cote | G07C 9/00722 340/5.31 |
| 7,634,927 | B1 * | 12/2009 | Tien | E05B 13/004 70/DIG. 60 |
| 8,011,702 | B2 | 9/2011 | Tien et al. | |
| 8,590,948 | B2 | 11/2013 | Shen | |
| 8,826,705 | B2 | 9/2014 | Tien | |
| 9,273,495 | B2 | 3/2016 | Tien | |
| 9,435,141 | B2 * | 9/2016 | Tien | E05B 41/00 |
| 10,060,161 | B2 | 8/2018 | Shen | |
| 10,604,963 | B2 | 3/2020 | Moon | |
| 11,365,563 | B2 | 6/2022 | Ginter et al. | |
| 11,414,892 | B2 | 8/2022 | Holtgrewe et al. | |
| 12,234,668 | B2 * | 2/2025 | Hoiland | E05B 41/00 |
| 2015/0167354 | A1 | 6/2015 | Tien | |
| 2018/0106077 | A1 * | 4/2018 | Shen | E05B 17/10 |
| 2020/0408002 | A1 | 12/2020 | Woodley et al. | |
| 2021/0164267 | A1 * | 6/2021 | Holtgrewe | E05B 65/1046 |
| 2022/0389740 | A1 | 12/2022 | Hoiland et al. | |
| 2024/0328208 | A1 * | 10/2024 | Arlinghaus | E05B 65/1053 |

* cited by examiner

EXIT DEVICE ASSEMBLY

CROSS-REFERENCE TO RELATED APPLICATION

The present application claims priority to, and the benefit of the filing date of, U.S. Provisional Application Ser. No. 63/493,851 filed on Apr. 3, 2023, which is incorporated herein by reference.

TECHNICAL FIELD

The present disclosure generally relates to exit device assemblies, and more particularly, but not exclusively, relates to locking and unlocking mechanisms for exit device assemblies.

BACKGROUND

Certain exit device assemblies generally include an interior pushbar assembly, an exterior trim, and a latch mechanism operably connected with the interior pushbar assembly and the exterior trim. The pushbar assembly is installed to an egress side of a door, and is operable to actuate the latch mechanism for egress from a room interior. The exterior trim is installed to a non-egress side of the door, and is at least selectively operable to actuate the latch mechanism for entry to the room from outside the room. Certain exit device assemblies include locking mechanisms by which the exterior trim can be selectively prevented from actuating the latch mechanism, and some such assemblies further include visual indicators by which the locked/unlocked state of the exterior trim can be discerned from within the room.

Many existing exit device assemblies suffer from one or more drawbacks or limitations. For example, the lock cylinder to lock and unlock the outside trim (lever) is provided on the outside trim. However, this presents a security issue since a user located within the room needs to open the door to lock the outside trim.

Some solutions to this problem provide a key cylinder on the center case of the pushbar assembly that is operated to block or unblock an input from the outside trim that unlatches the door. However, these solutions require a new center case for the pushbar assembly in order to accommodate the key cylinder. In addition, locking and unlocking the door from the outside trim may not be possible when the input is blocked by the pushbar key cylinder. For these reasons among others, there remains a need for further improvements in this technological field.

SUMMARY

An exit device assembly is provided in which the exterior trim can be locked and unlocked from an interior lock cylinder assembly on the interior side of the door and from an exterior lock cylinder assembly on an exterior side of the door. In an embodiment, the interior lock cylinder assembly is located on the center case of the pushbar assembly, and the exterior lock cylinder assembly is located on the exterior trim. In an embodiment, the interior lock cylinder assembly is operable to transition the exterior trim between a locked state and an unlocked state, and the exterior lock cylinder assembly is operable to provide a night latch function such that the exterior trim will only remain unlocked while a key is inserted in the exterior lock cylinder assembly. Further embodiments, forms, features, and aspects of the present application shall become apparent from the description and figures provided herewith.

DETAILED DESCRIPTION OF ILLUSTRATIVE EMBODIMENTS

Figure 1:
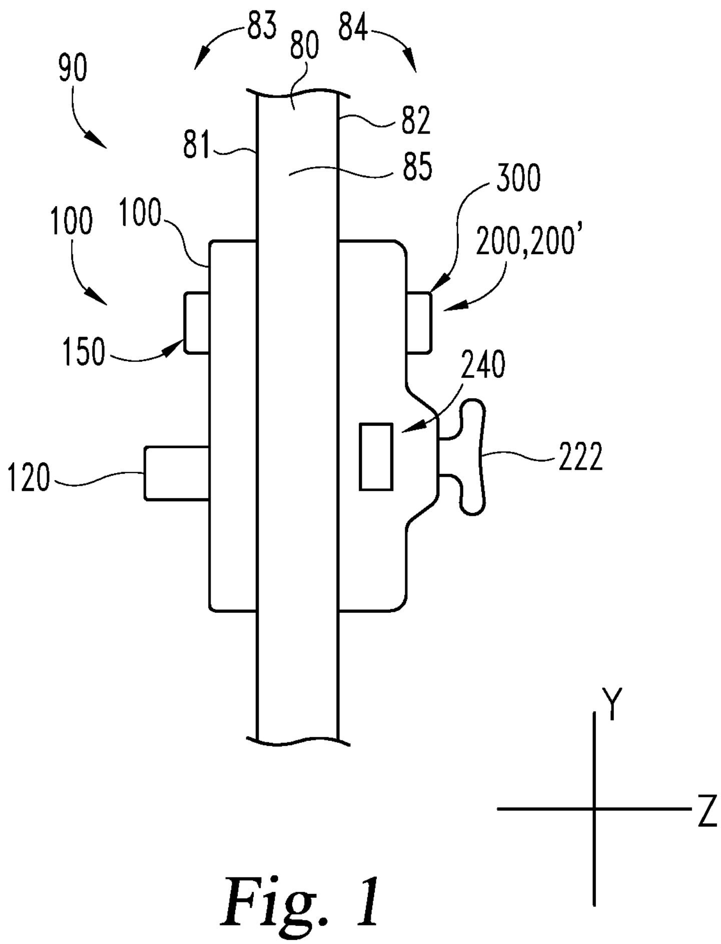
FIG. 1 is a schematic representation of an exit device assembly according to certain embodiments installed to a door.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the terms "longitudinal," "lateral," and "transverse" are used to denote motion or spacing along three mutually perpendicular axes, wherein each of the axes defines two opposite directions. In the coordinate system illustrated in the Figures, the X-axis defines first and second longitudinal directions, the Y-axis defines first and second lateral directions, and the Z-axis defines first and second transverse directions. These terms are used for case and convenience of description, and are without regard to the orientation of the system with respect to the environment. For example, descriptions that reference a longitudinal direction may be equally applicable to a vertical direction, a horizontal direction, or an off-axis orientation with respect to the environment.

Furthermore, motion or spacing along a direction defined by one of the axes need not preclude motion or spacing along a direction defined by another of the axes. For example, elements that are described as being "laterally offset" from one another may also be offset in the longitudinal and/or transverse directions, or may be aligned in the longitudinal and/or transverse directions. The terms are therefore not to be construed as limiting the scope of the subject matter described herein to any particular arrangement unless specified to the contrary.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

With reference to FIG. 1, illustrated therein is a door 80 having installed thereon an access control device in the form of an exit device assembly 90 according to certain embodiments. The door 80 generally includes a non-egress side 81 and an egress side 82 opposite the non-egress side 81. When the door 80 is in its closed position, the non-egress side 81 faces an exterior or outer region 83, and the egress side 82 faces an interior or access-controlled region 84. The door 80 also includes a free edge 85 that faces a doorframe when the door 80 is in its closed position.

The exit device assembly 90 generally includes an exterior trim 100 installed to the non-egress side 81 and a pushbar assembly 200, 200' installed to the egress side 82. An exterior lock cylinder assembly 150 is installed on exterior trim 100, and an interior lock cylinder assembly 300 is installed on pushbar assembly 200, 200' on the egress side 82. As described herein, the illustrated pushbar assembly 200, 200' includes a latch mechanism 240 and a pushbar 222 operable to actuate the latch mechanism 240. The exterior trim 100 includes a manual actuator 120 that is selectively operable to actuate the latch mechanism 240 based upon a locked/unlocked state of the exterior trim 100, which can be controlled by exterior lock cylinder assembly 150 and/or the interior lock cylinder assembly 300.

Figure 2:
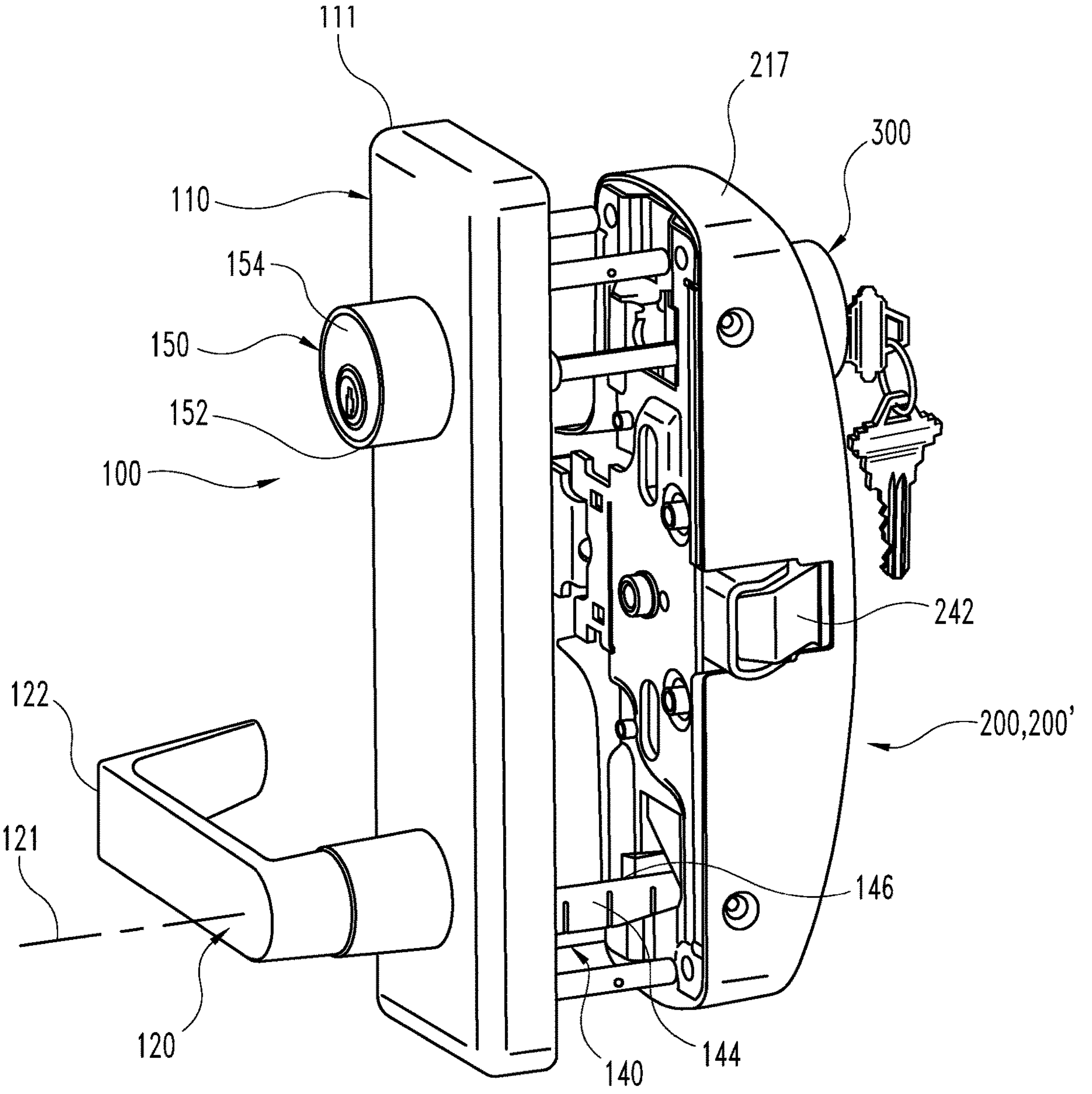
FIG. 2 is a perspective illustration of an exterior trim an interior center case according to certain embodiments.

With additional reference to FIG. 2, the trim 100 generally includes an escutcheon 110, a manual actuator 120 rotatably mounted to the escutcheon 110, a motion translation device (not shown) such as a cam within escutcheon 110 engaged with the manual actuator 120, and a lift finger assembly 140 engaged with the manual actuator 120 via the motion translation device such that rotation of the manual actuator 120 lifts or causes vertical displacement of the lift finger assembly 140. As described herein, the lift finger assembly 140 includes a finger 146 that extends through the door 80 and is engaged with the pushbar assembly 200 such that rotation of the manual actuator 120 selectively actuates the latch mechanism 240.

Figure 10:
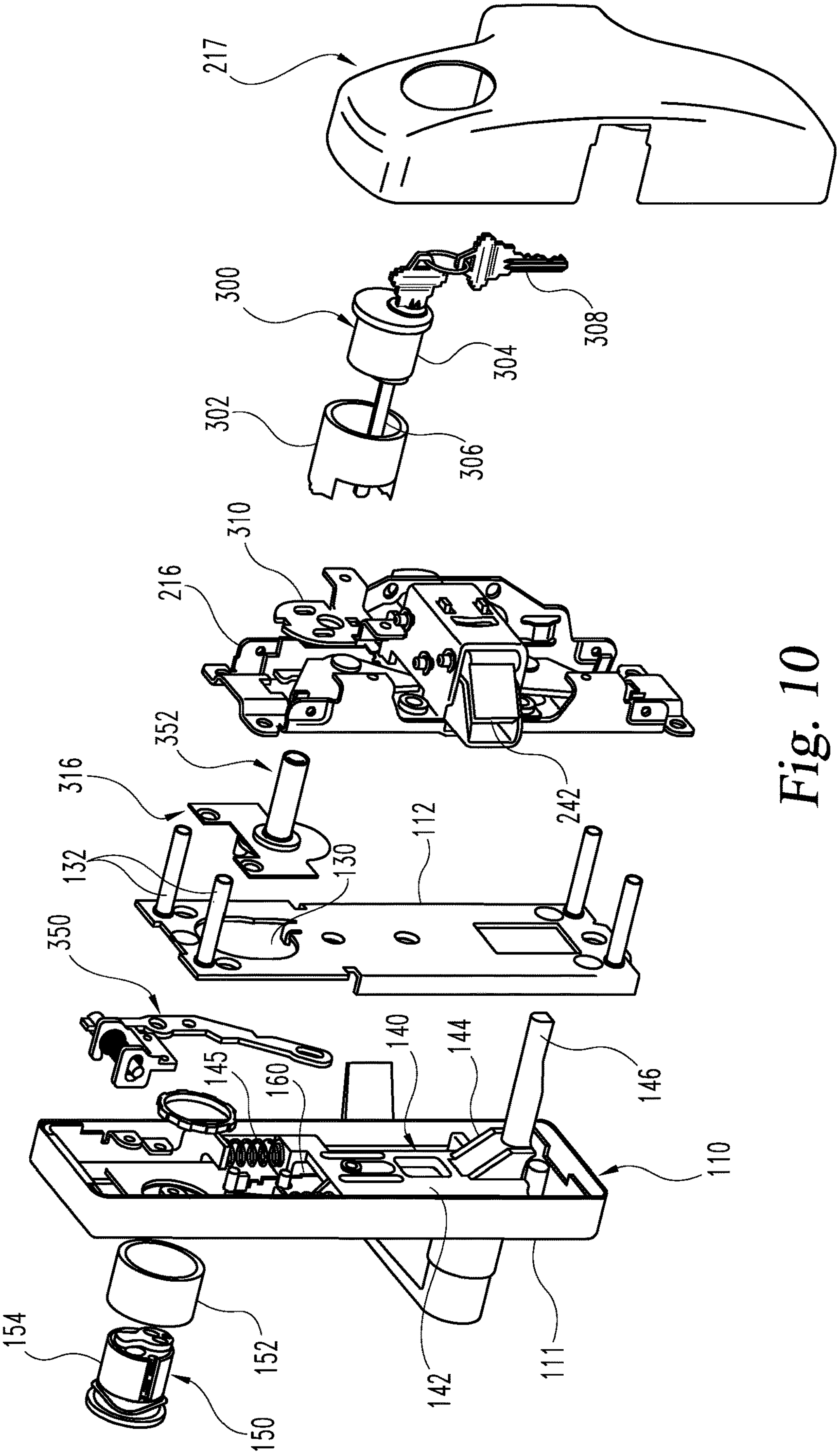
FIG. 10 is a partially exploded assembly view of an exterior trim and interior center case according to another embodiment.

The escutcheon 110 is mounted to the non-egress side 81 of the door 80, and includes a housing 111 defining an interior in which various working components of the trim 100 are seated. The escutcheon 110 further includes structure on which the lift finger assembly 140 is slidably mounted for movement between a deactuated position and an actuated position. While various forms are contemplated, in the illustrated embodiment, the deactuated position is a vertically lower position and the actuated position is a vertically upper position such that the lift finger assembly 140 is lifted from its deactuated position to its actuated position. The escutcheon 110 may further include a bias member 115 (FIG. 10) urging the lift finger assembly 140 toward its deactuated position. The bias member 115 may include any suitable biasing features, such as one or more compression springs, torsion springs, extension springs, elastic members, and/or magnets. Examples of lift finger assembly arrangements and other features related to exit device assemblies are provided in commonly owned U.S. Patent Application Publication No. 2022/0389740 and U.S. Patent Application Publication No. 2021/0164267, each of which is incorporated herein by reference in its entirety for all purposes.

The manual actuator 120 is pivotally mounted to the escutcheon 110, and is operable to laterally (along the Y-axis) drive the lift finger assembly 140 between its deactuated position and its actuated position. In the illustrated form, the manual actuator 120 is rotatable about a transverse axis 121, and is operably connected with the motion translation device or other structure linked to lift finger assembly 140 such that rotation of the manual actuator 120 causes a corresponding displacement of lift finger assembly 140. While the illustrated manual actuator 120 is provided in the form of a lever 122 that rotates about the transverse axis 121 in order to lift the lift finger assembly 140, it is to be appreciated that other forms are contemplated. For example, in certain embodiments, the manual actuator 120 may be provided as a knob that rotates about the transverse axis 121 in order to lift the lift finger assembly 140. In other forms, the manual actuator 120 may be provided in the form of a thumb lever that pivots about a longitudinal axis in order to lift the lift finger assembly 140.

Figure 7:
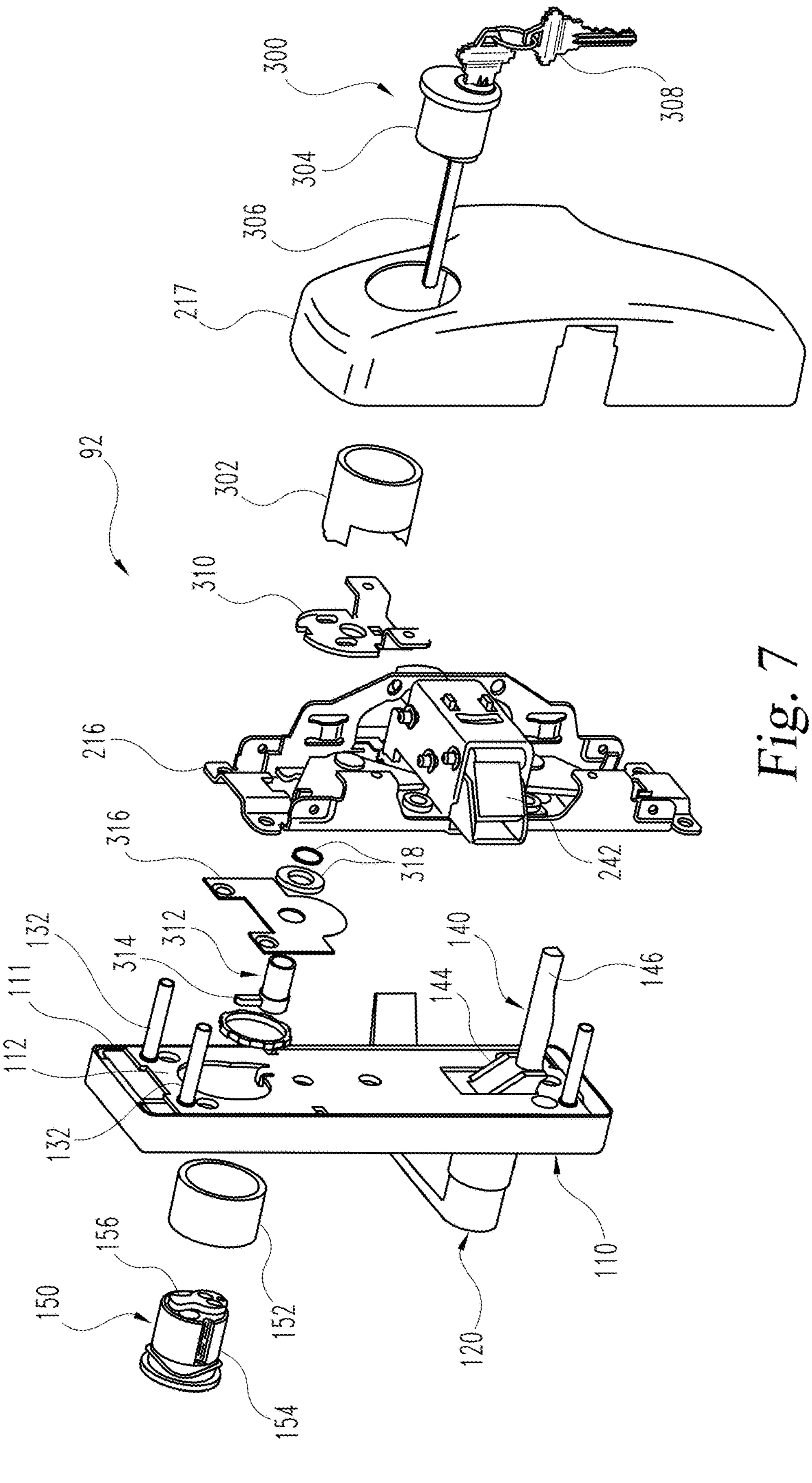
FIG. 7 is a partially exploded assembly view of an exterior trim and interior center case according to an embodiment.

The lift finger assembly 140 generally includes a driving piece 142 (FIGS. 8A-8D) engaged with manual actuator 120 through the motion translation device, and a driven piece 144 (FIG. 7) engaged with the driving piece 142. The driven piece 144 includes at least one finger 146. As described herein, the finger(s) 146 extend through the door 80 such that the finger(s) 146 are operable to engage the pushbar assembly 200. Rotation of the manual actuator 120 drives the driving piece 142 upward in exterior trim 100 against the force of the bias member 115, and the upward motion of the driving piece 142 is transmitted to the driven piece 144 via the one or more springs or other structure. In the event that the driven piece 144 is prevented from such upward movement, the springs or other structure connecting driving piece 142 and driven piece 144 may compress to permit continued motion of the driving piece 142, thereby enabling at least some movement of the manual actuator 120. As described herein, the finger(s) 146 is operable to engage the pushbar assembly 200 such that movement of the lift finger assembly 140 in an actuating direction (e.g., by the manual actuator 120) actuates the latch mechanism 240 when the exterior trim 100 is in an unlocked state.

The exterior lock cylinder assembly 150 is mounted to the escutcheon 110, and generally includes a lock cylinder or shell 152 and a plug 154 engaged with the shell 152. As is typical of lock cylinders, plug 154 is rotatably mounted in the shell 152, and a tumbler system is provided that is operable to selectively prevent rotation of the plug 154 relative to the shell 152. As discussed further below, plug 154 includes a cam 156 that, upon insertion of a proper key, the key can be rotated to rotate the plug, thereby rotating the cam 156 to unlock the exterior trim 100. Such rotation may, for example, enable manual actuator 120 to actuate a latch control assembly 230 of the pushbar assembly 200 to actuate the latch mechanism 240.

Figure 3:
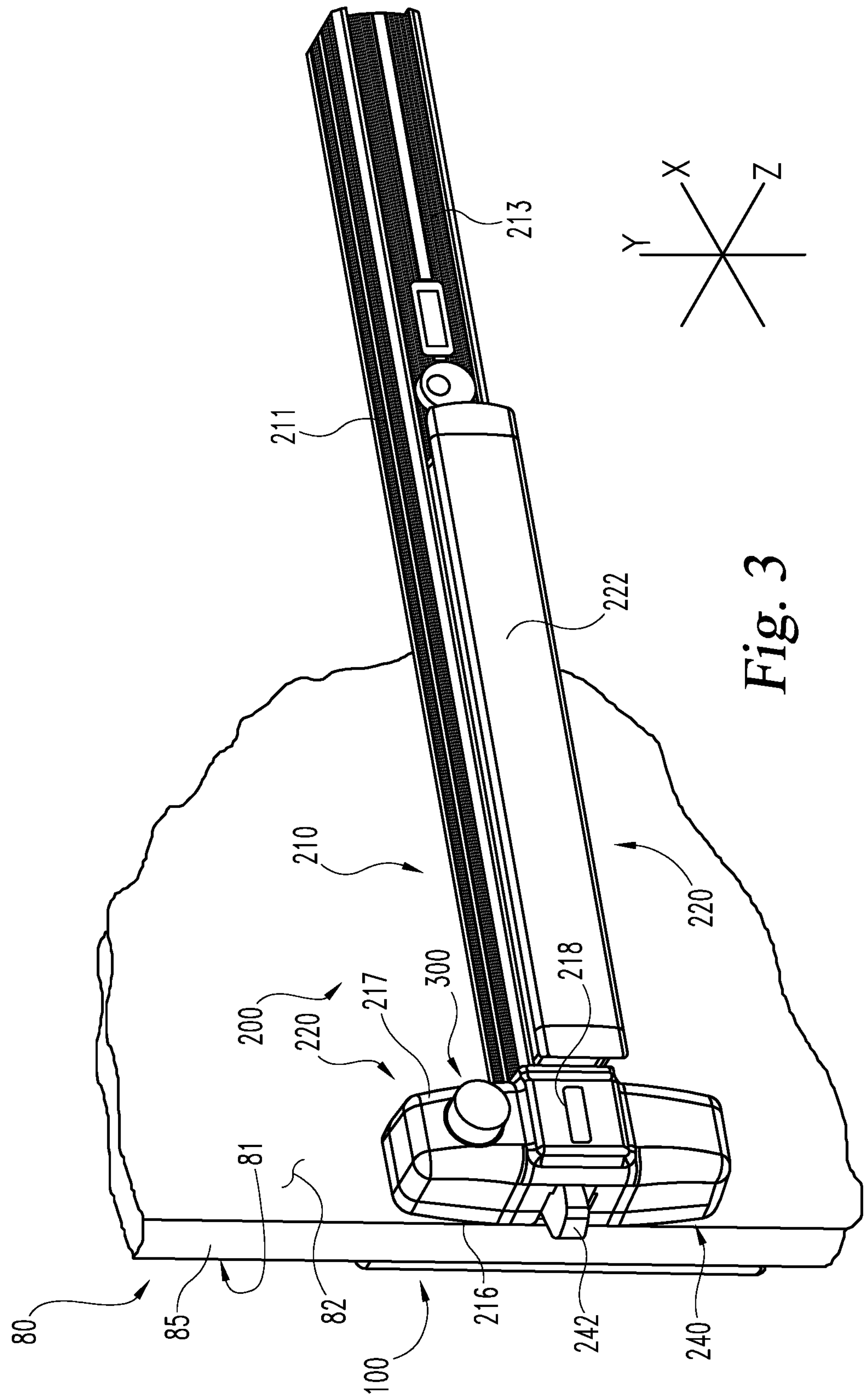
FIG. 3 is a perspective illustration of a pushbar assembly according to certain embodiments installed to a door.
Figure 4:
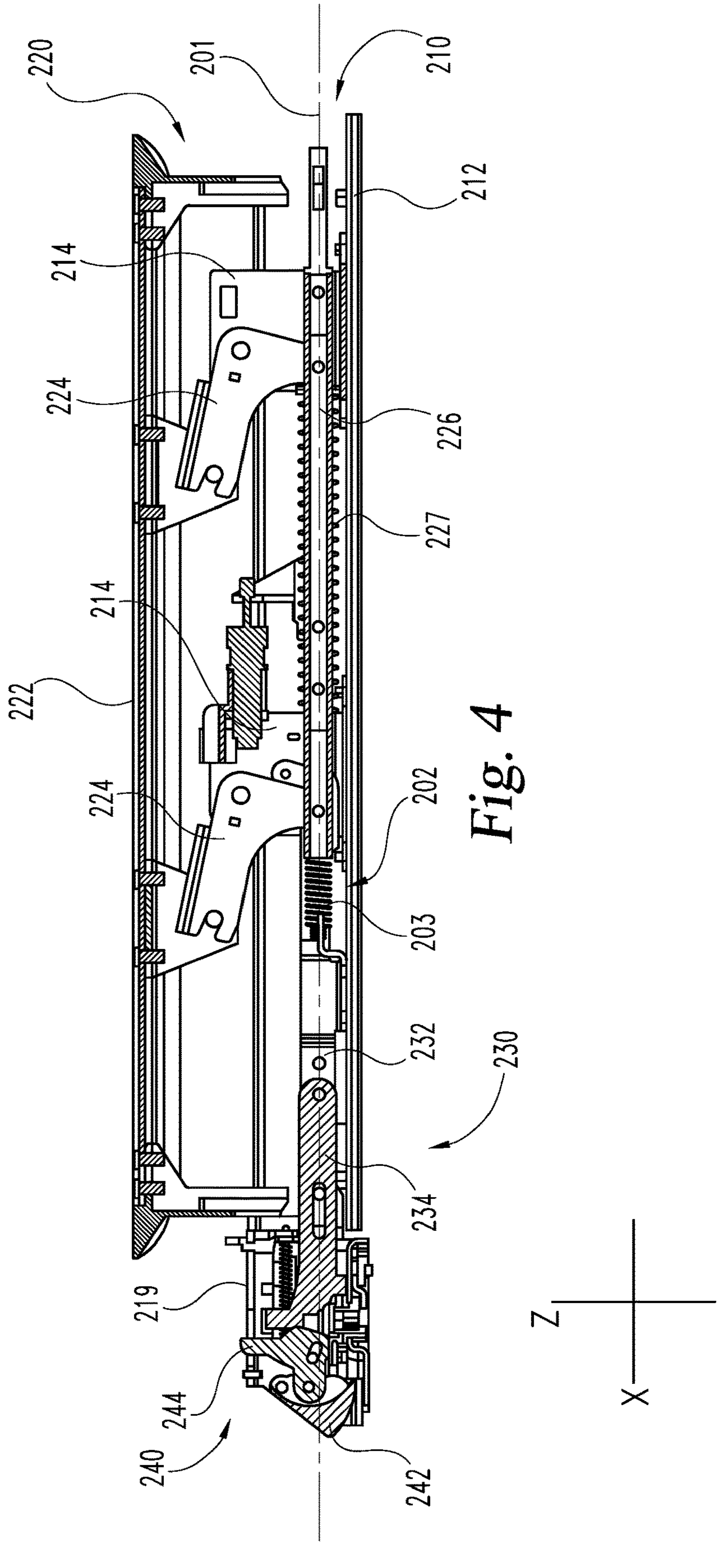
FIG. 4 is a cross-sectional illustration of a portion of the pushbar assembly.
Figure 5:
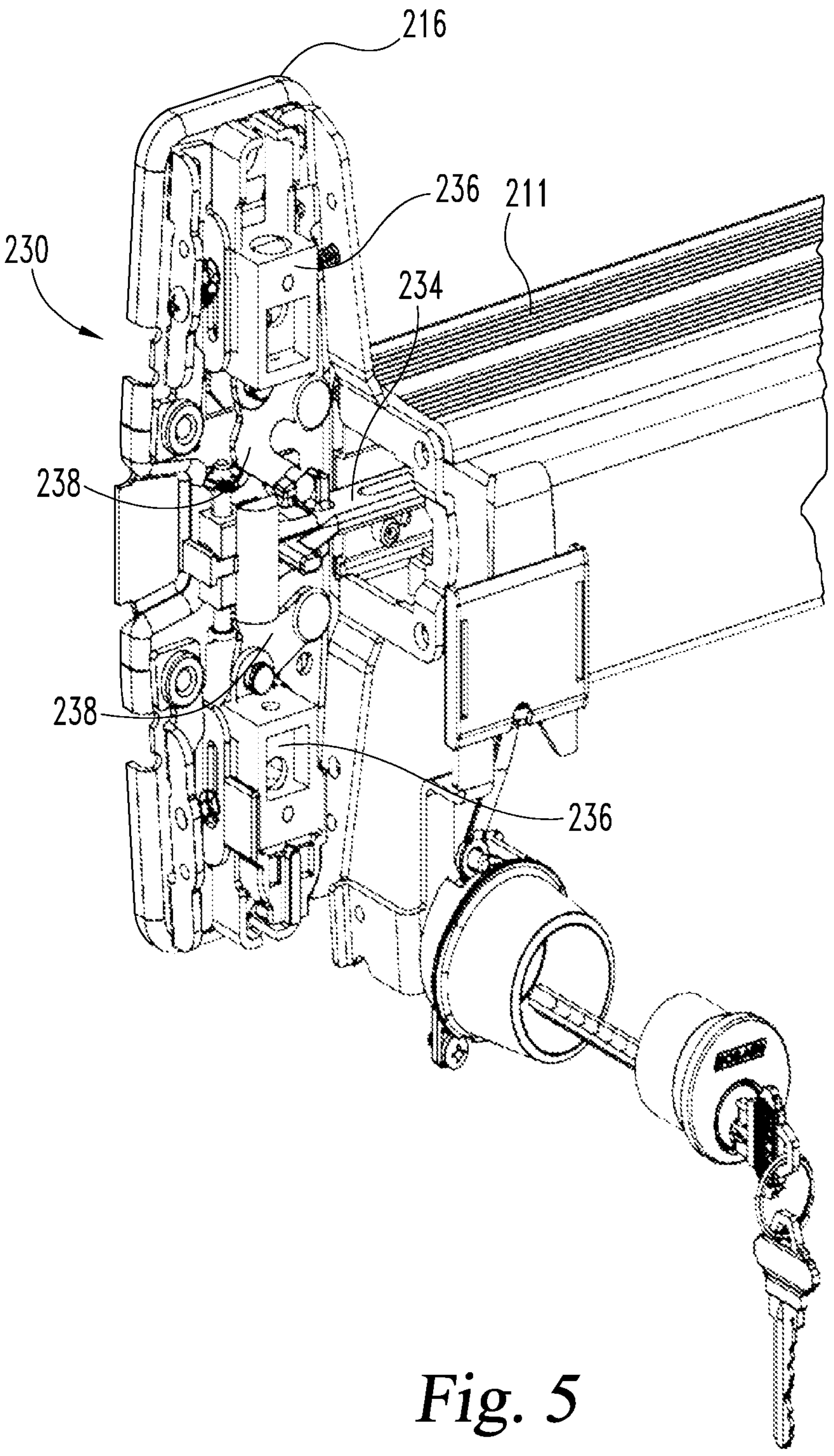
FIG. 5 is an assembly view of a portion of the pushbar assembly.

With additional reference to FIGS. 3-5, an embodiment of pushbar assembly 200 is shown that generally includes a mounting assembly 210, a drive assembly 220 movably mounted to the mounting assembly 210, and a latch control assembly 230 operably coupled with the drive assembly 220, and in the illustrated form, further includes the latch mechanism 240 and interior lock cylinder assembly 300.

The mounting assembly 210 generally includes a longitudinally-extending channel member 211, which extends along a longitudinal axis 201 of the pushbar assembly 200. The mounting assembly 210 also includes a mounting plate 212 mounted in the channel member 211, a cover plate 213 enclosing a distal end portion of the channel member 211, a pair of bell crank mounting brackets 214 extending transversely from the mounting plate 212, a header plate 216 positioned adjacent a proximal end of the mounting plate 212, and a header case 217 mounted to the header plate 216, and a header bracket 219 mounted within the header case 217. In certain embodiments, the header case 217 defines a window 218 through which a status-indicator is visible to indicate a locked or unlocked status of exterior trim 100.

The drive assembly 220 generally includes a transversely-movable pushbar 222, a pair of bell cranks 224 connecting the pushbar 222 with a longitudinally-movable drive rod 226, and a main spring 227 urging the drive assembly 220 toward a deactuated state. The pushbar 222 is mounted for transverse movement between a projected position and a depressed position to transition the drive assembly 220 between a deactuated state in which the pushbar 222 is in its projected position and an actuated state in which the pushbar 222 is in its depressed position. The bell cranks 224 are mounted to the bell crank mounting brackets 214, and correlate the transverse movement of the pushbar 222 with longitudinal movement of the drive rod 226. More particularly, the bell cranks 224 cause the drive rod 226 to move between a proximal position (to the left in FIG. 4) and a distal position (to the right in FIG. 4) such that the proximal position is correlated with the projected or deactuated position of the pushbar 222 and the distal position is correlated with the depressed or actuated position of the pushbar 222. Additionally, the main spring 227 is engaged between the drive rod 226 and the mounting assembly 210 such that the main spring 227 urges the drive rod 226 toward its proximal position, thereby biasing the drive assembly 220 toward its deactuated state.

The drive assembly 220 is connected with the latch control assembly 230 via a lost motion connection 202 that causes actuation of the latch control assembly 230 in response to actuation of the drive assembly 220, and which permits the drive assembly 220 to remain in its deactuated state when the latch control assembly 230 is actuated by another mechanism (e.g., the exterior trim 100). As a result, the drive assembly 220 is operable to actuate the latch control assembly 230, and is operable to remain unactuated when the latch control assembly 230 is actuated by the exterior trim 100. The lost motion connection 202 may include a bias member such as a spring 203 urging the latch control assembly 230 toward a deactuated state thereof.

The latch control assembly 230 generally includes a control link 232 connected with the drive rod 226 via the lost motion connection 202, a yoke 234 connected with the control link 232 for joint movement along the longitudinal axis 201, a pair of drivers 236 mounted to the header plate 216 for lateral movement, and a pair of pivot cranks 238 operably coupling the drivers 236 with the yoke 234. The control link 232 is connected with the drive assembly 220 such that actuation of the drive assembly 220 longitudinally drives the control link 232 and the yoke 234 between a proximal deactuated position and a distal actuated position. The drivers 236 are mounted for lateral movement between a laterally-outward deactuated position and a laterally-inward actuated position, and the pivot cranks 238 correlate longitudinal movement of the control link 232 and yoke 234 with lateral movement of the drivers 236.

As used herein, the terms "laterally inward" and "laterally outward" may be used to denote positions and/or motion relative to the longitudinal axis 201. For example, a laterally inward position is one nearer the longitudinal axis 201, and a laterally outward position is one farther from the longitudinal axis 201. Thus, while the laterally inward and laterally outward positions for the upper driver 236 are respectively provided as a lower position and an upper position, the laterally inward and laterally outward positions for the lower driver 236 are respectively provided as an upper position and a lower position. Similarly, laterally inward movement is movement toward the longitudinal axis 201, while laterally outward movement is movement away from the longitudinal axis 201. Thus, laterally inward movement for the upper driver 236 is downward movement, while laterally outward movement for the upper driver 236 is upward movement. Conversely, laterally inward movement for the lower driver 236 is upward movement, while laterally outward movement for the lower driver 236 is downward movement.

As noted above, the pivot cranks 238 correlate longitudinal movement of the control link 232 and the yoke 234 with lateral movement of the drivers 236. More particularly, the pivot cranks 238 correlate distal movement of the control link 232 and the yoke 234 with laterally inward or actuating movement of the drivers 236, and correlate proximal movement of the control link 232 and the yoke 234 with laterally outward or deactuating movement of the drivers 236. The latch control assembly 230 has an actuating state in which each component thereof is in a corresponding and respective actuating position, and a deactuating state in which each component thereof is in a corresponding and respective deactuating position. For the control link 232 and the yoke 234, the actuating position is a distal position, and the deactuating position is a proximal position. For the drivers 236, the actuating position is a laterally inward position, and the deactuating position is a laterally outward position.

The latch mechanism 240 is operably connected with the latch control assembly 230 such that actuating movement of the latch control assembly 230 causes a corresponding actuation of the latch mechanism 240. In the illustrated form, the latch mechanism 240 generally includes a latchbolt 242 and a retractor 244 connecting the latchbolt 242 with the yoke 234 such that distal actuating movement of the yoke 234 drives the latchbolt 242 from an extended position to a retracted position. As described herein, such actuating movement may be imparted to the latch control assembly 230 by the drive assembly 220, and may also be imparted to the latch control assembly 230 by the exterior trim 100 when unlocked. In an embodiment, finger(s) 146 of lift finger assembly 140 engage the lower driver 236 so that vertical movement of lift finger assembly 140 by rotating manual lever 120 displaces lower driver 236 laterally inwardly toward an actuating position that drives latchbolt 242 to a retracted position.

In the illustrated form, the latch mechanism 240 is installed in the header case 217, and engages a doorframe-mounted strike when the door 80 is closed and the pushbar assembly 200 is deactuated. It is also contemplated that the exit device assembly 90 may include latch mechanisms in additional or alternative locations. As one example, a latch mechanism may be provided in a mortise assembly configured for installation in a mortise cutout within the door. Additionally or alternatively, the exit device assembly 90 may be provided as a vertical exit device assembly including an upper latch mechanism and/or a lower latch mechanism. In such a vertical exit device, the upper latch mechanism may be installed above the pushbar assembly 200 (e.g., adjacent the top edge of the door 80) and connected to the upper driver 236 via an upper connector (e.g., a rod or cable). Additionally or alternatively, a lower latch mechanism may be installed below the pushbar assembly (e.g., adjacent the bottom edge of the door 80) and connected to the lower driver 236 via a lower connector (e.g., a rod or cable). In certain forms, a vertical exit device may be provided as a concealed vertical exit device, in which the connectors run through channels formed within the door 80. In other embodiments, a vertical exit device may be provided as a surface vertical exit device, in which the connectors are mounted to the egress side 82 of the door 80.

Figure 6:
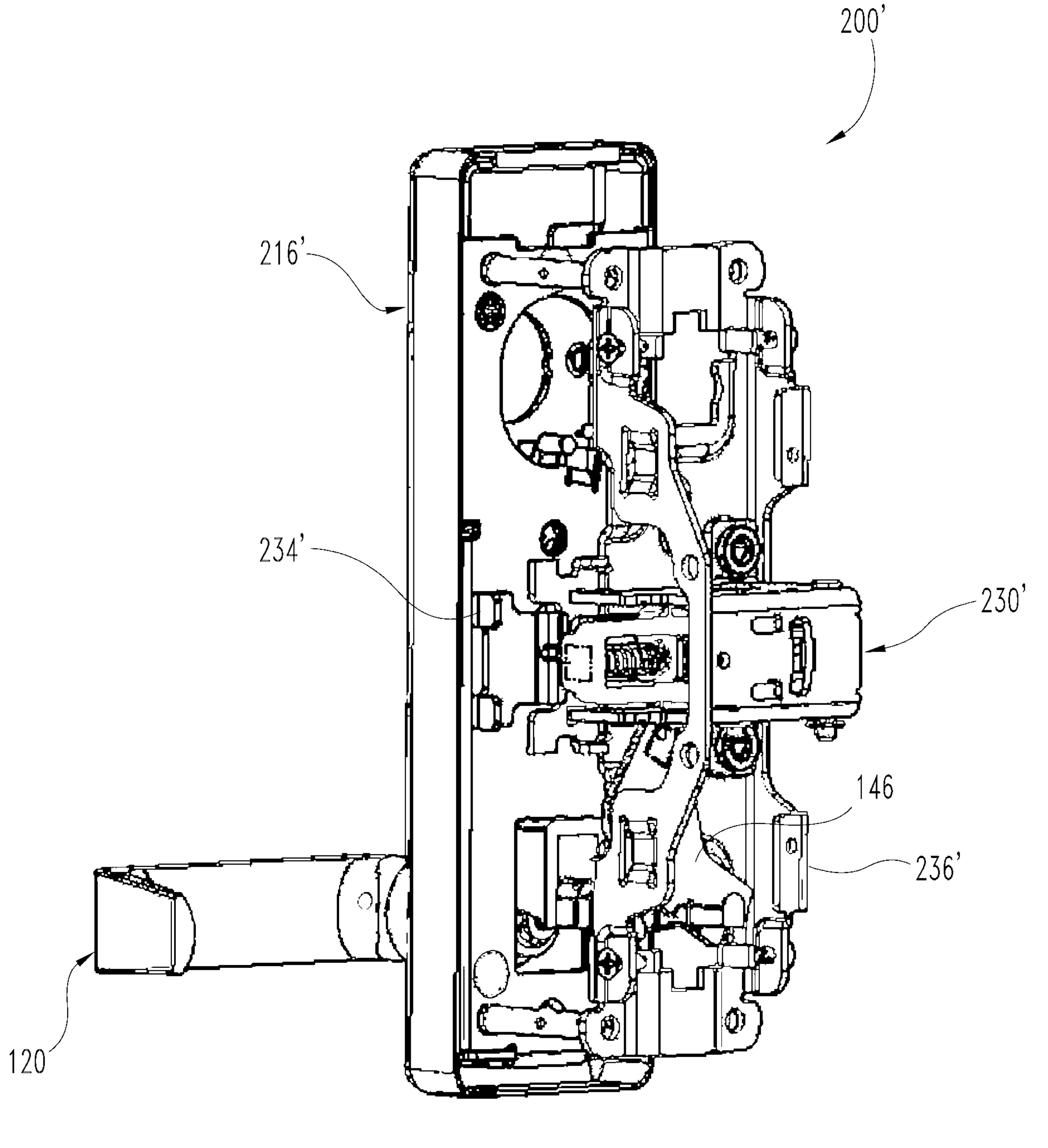
FIG. 6 is an assembly view of a portion of another embodiment pushbar assembly.

FIG. 6 shows an assembly view of another embodiment pushbar assembly 200' that is similar to pushbar assembly 200. Pushbar assembly 200' includes a header plate 216' and a latch control assembly 230' mounted to header plate 216'. Latch control assembly 230' is connected to yoke 234' and is operable to retract a latchbolt similar to pushbar assembly 200. However, pushbar assembly 200' does not include pivot cranks. A driver 236' is provided that can engage finger(s) 146 of lift finger assembly 140 to retract the latchbolt by rotating a manual lever similar to the manner discussed above for manual lever 120.

With additional reference to FIGS. 7-9D, further details of an embodiment of a locking mechanism 92 for manual actuator 120 of exit device assembly 90 is shown. The locking mechanism 92 includes exterior lock cylinder assembly 150 and interior lock cylinder assembly 300 that each manipulate a locking arm 160 in exterior trim 100 to lock and unlock manual actuator 120. The exterior lock cylinder assembly 150 includes a shell 152 mounted to escutcheon 110, and a plug 154 that is rotatable within shell 152 when an appropriate key is inserted into plug 154. Plug 154 includes a first cam or mortise cam 156 at the inner end of plug 154. As discussed further below, mortise cam 156 is engageable to locking arm 160 in order to block or unblock movement of the lift finger assembly 140 to lock and unlock manual actuator 120.

Interior lock cylinder assembly 300 includes a lock cylinder or outer shell 302 mounted to header case 217 with a cylinder mounting bracket 310. The cylinder mounting bracket 310 can be mounted to header case 217 and/or header plate 216. Interior lock cylinder assembly 300 further includes a plug 304 rotatable within shell 302 when an appropriate key 308 is inserted into plug 304. Plug 304 includes a tailpiece 306 extending therefrom that is configured to extend through header plate 216 for engage a device cam 312. Device cam 312 includes a cam lobe 314 that, as discussed further below, is engageable to a locking arm 160 in order to block or unblock movement of the lift finger assembly 140.

Cam bracket 316 is mounted to trim plate 112 with fasteners. Trim rods 132 extend from escutcheon 110 are used to mount header plate 216. Cam bracket 316 is positioned against trim plate 112 with cam lobe 314 through trim plate opening 130 to engage locking arm 160 within exterior trim 100. Device cam 312 also includes an internal longitudinal passage that is configured to receive tailpiece 306. The internal passage and tailpiece 306 are complementary in shape so that rotation of tailpiece 306 via key 308 in plug 304 causes rotation of device cam 312 and its radially extending cam lobe 314. A retaining nut 318 and/or spacers 319 can be used between header plate 216, cam bracket 316, and/or trim plate 112 to secure lock cylinder assembly 150.

Referring to FIGS. 8A-8D, there is shown operation of exterior lock cylinder assembly 150 to selectively lock and unlock the manual actuator 120 using a key on the non-egress side 81 of door 80. The exterior lock cylinder assembly 150 is configured to rotate between a first position in FIGS. 8A and 8D in which the manual actuator 120 is prevented from being operated to actuate the latch mechanism 240 from the deactuated state to the actuated state and a second position in FIGS. 8B and 8C in which the exterior lock cylinder assembly 150 enables manual actuator 120 to be operated to actuate the latch mechanism 240 from the deactuated state to the actuated state.

In the illustrated embodiment, locking arm 160 includes an elongated body 162 extending from a first end 164 pivotally mounted to the exterior trim 100 to an opposite outer second end 166. The outer second end 166 is selectively engageable by mortise cam 156 of the exterior lock cylinder assembly 150 to pivot the locking arm 160 between the locked position of FIGS. 8A and 8D and the unlocked position of FIGS. 8B and 8C. Locking arm 160 includes a blocking portion 168 projecting laterally outwardly from body 162 that interacts with a flange 143 of driving piece 142 of lift finger assembly 140 when in the locked position to prevent driving piece 142 from being lifted vertically a distance sufficient by manual actuator 120 to actuate the latch mechanism, as shown in FIGS. 8A and 8D. The blocking portion 168 is moved out of the path of movement of the driving piece 142 in FIGS. 8B and 8C.

In an embodiment, driving piece 142 includes a slot 145, and first end 164 of locking arm 160 is coupled to exterior trim 100 through slot 145. Slot 145 translates along first end 164 as driving piece 142 is driven with manual actuator 120.

Referring to FIGS. 9A-9D, there is shown operation of interior lock cylinder assembly 300 to selectively lock and unlock the manual actuator 120 to operate latch mechanism 240 using a key on the egress side 82 of door 80. The interior lock cylinder assembly 300 is configured to rotate between a first position in FIGS. 9A and 9D in which the manual actuator 120 is prevented from being operated to actuate the latch control assembly 230 from the deactuated state to the actuated state and a second position in FIGS. 9B and 9C which the interior lock cylinder assembly 30 enables manual actuator 120 to be operated to actuate the latch mechanism 240 from the deactuated state to the actuated state.

The interior lock cylinder assembly 300 is configured to rotate independently of exterior lock cylinder assembly 150. The outer second end 166 of locking arm 160 is selectively engageable by cam lobe 314 of the device cam 312 that is rotated by interior lock cylinder assembly 300 to pivot the locking arm 160 between the locked position of FIGS. 9A and 9D and the unlocked position of FIGS. 9B and 9C.

FIGS. 8A-8D show the lock and unlock functions of exterior lock cylinder assembly 150. In FIG. 8A, the manual actuator 120 of exterior trim 100 is secured or locked, no key is present, and the exterior lock cylinder assembly 300 is locked with plug 154 and mortise cam 156 oriented at 0 degrees vertical in the Y direction. The interior lock cylinder assembly 300 and its cam lobe 314 are also at 0 degrees.

Figure 8B:
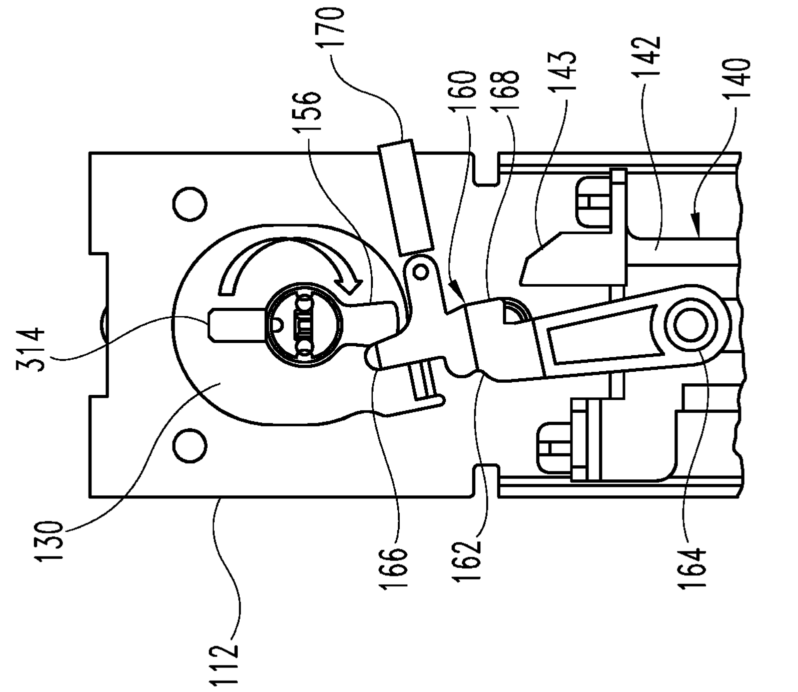
FIGS. 8A-8D illustrate various positions relating to operation of the exterior lock cylinder assembly that provide locked and unlocked states of the exterior trim.
Figure 8A:
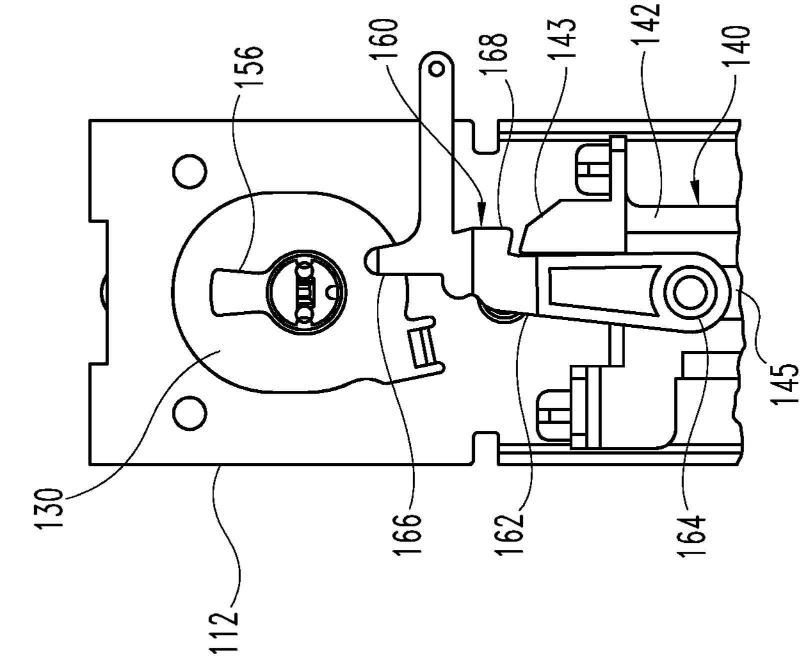
Figure 8D:
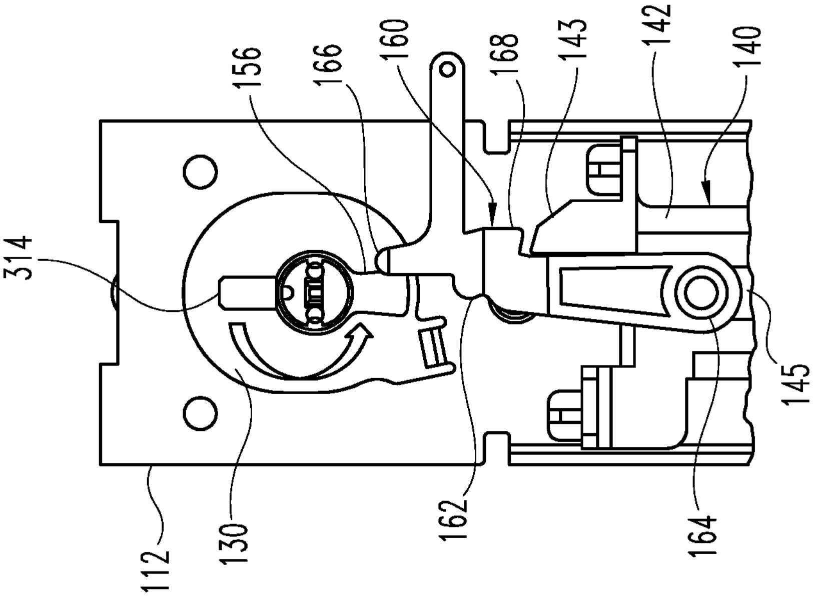
Figure 8C:
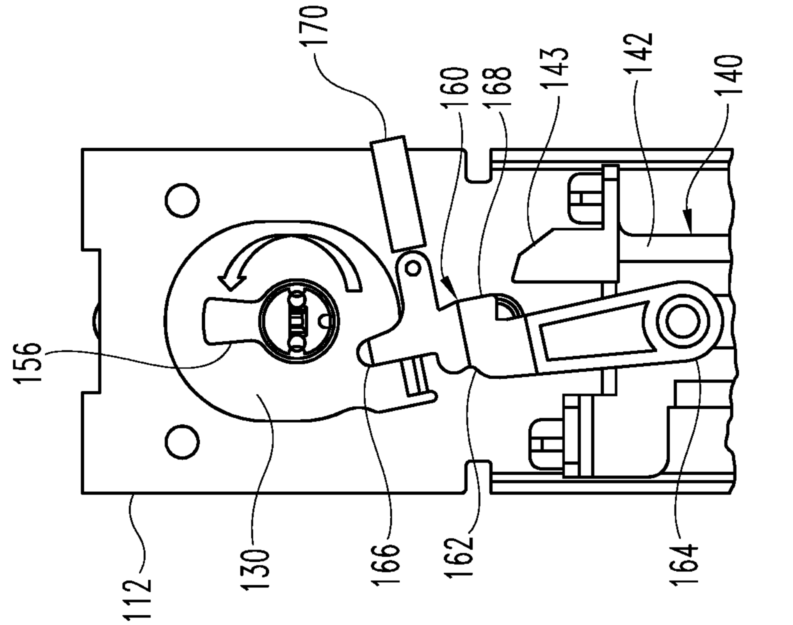

In FIG. 8B, plug 154 and mortise cam 156 are rotated 180 degrees clockwise (or counterclockwise depending on configuration) to contact locking arm 160 at second end 166, and pivot locking arm 166 about first end 164 a sufficient angular displacement, such as twelve degrees, to move blocking portion 168 out of the path of driving piece 142 of lift finger assembly 140. The interior lock cylinder assembly 300 and its cam lobe 314 are not rotated and remain at 0 degrees. In FIG. 8C, plug 154 and mortise cam 156 are rotated 180 degrees counterclockwise from the position of FIG. 8B, and locking arm 166 remains pivoted, such as with an over-center spring 170, to keep blocking portion 168 out of the path of driving piece 142 of lift finger assembly 140. The interior lock cylinder assembly 300 and its cam lobe 314 are not rotated and remain at 0 degrees. The key in exterior lock cylinder assembly 150 cannot be removed until rotated back to 0 degrees. The manual actuator 120 is operable to actuate the latch mechanism 240 from the deactuated state to the actuated state. Over-center spring 170 can assist in maintaining locking arm 160 in the pivoted, unlocked position and in the locked position.

In FIG. 8D, the key is re-inserted in exterior lock cylinder assembly 150, and plug 154 and mortise cam 156 are rotated 180 degrees counterclockwise to contact locking arm 160 at second end 166, and pivot locking arm 166 about first end 164 to move blocking portion 168 back into the path of flange 143 of driving piece 142 of lift finger assembly 140. The interior lock cylinder assembly 300 and its cam lobe 314 are not rotated and remain at 0 degrees.

Figure 9B:
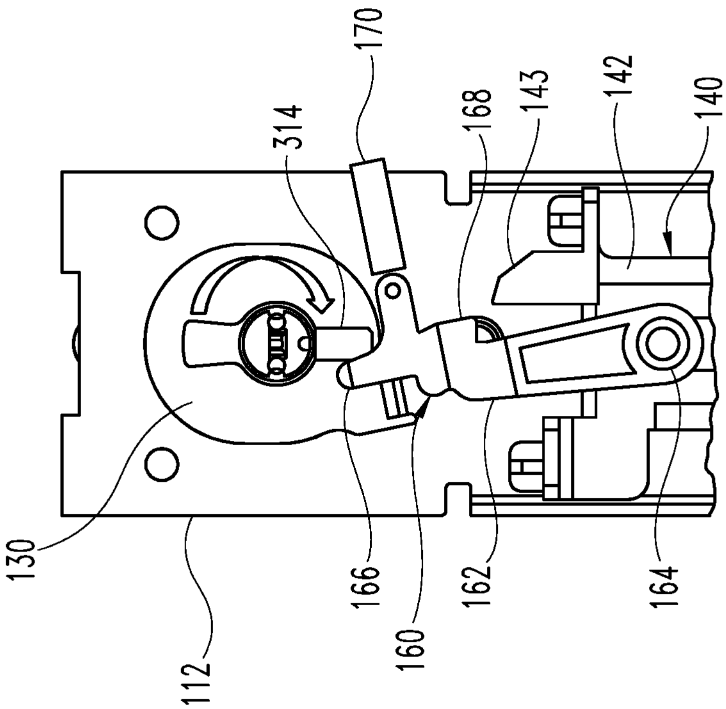
FIGS. 9A-9D illustrate various positions relating to operation of the interior lock cylinder that provide locked and unlocked states of the exterior trim.
Figure 9A:
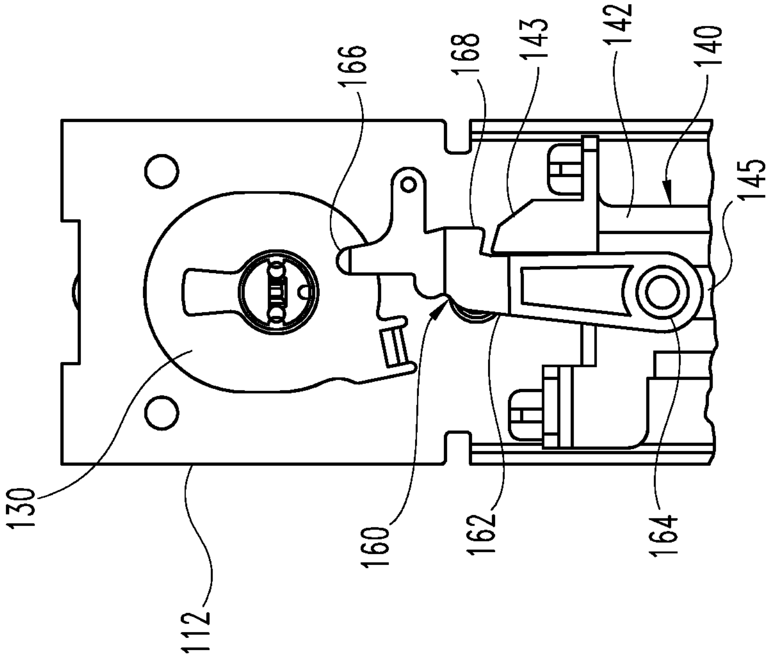

FIGS. 9A-9D show the lock and unlock functions of interior lock cylinder assembly 300. In FIG. 9A, the manual actuator 120 of exterior trim 100 is secured or locked, no key is present, and the interior lock cylinder assembly 300 is locked with plug 304 and cam lobe 314 of device cam 312 at 0 degrees. The exterior lock cylinder assembly 150 and its mortise cam 156 are also at 0 degrees.

In FIG. 9B, plug 304 and cam lobe 314 are rotated 180 degrees clockwise to contact locking arm 160 at second end 166, and pivot locking arm 166 about first end 164 a sufficient angular amount, such as twelve degrees, to move blocking portion 168 out of the path of flange 143 of driving piece 142 of lift finger assembly 140. The exterior lock cylinder assembly 150 and its mortise cam 156 are not rotated and remain at 0 degrees. In FIG. 9C, plug 304 and cam lobe 314 are rotated 180 degrees counterclockwise from the position of FIG. 9B, and locking arm 160 remains pivoted to keep blocking portion 168 out of the path of driving piece 142 of lift finger assembly 140. The exterior lock cylinder assembly 150 and its mortise cam 156 are not rotated and remain at 0 degrees. In this position, the key in interior lock cylinder assembly 300 can be removed and the manual actuator 120 is operable to actuate the latch mechanism 240 from the deactuated state to the actuated state. An over-center spring 170 can maintain locking arm 160 in the pivoted, unlocked position.

Figure 9D:
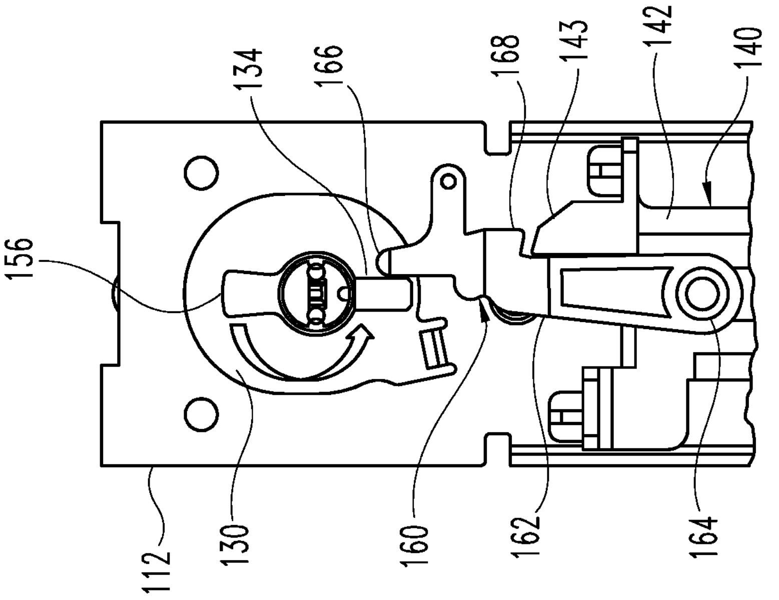
Figure 9C:
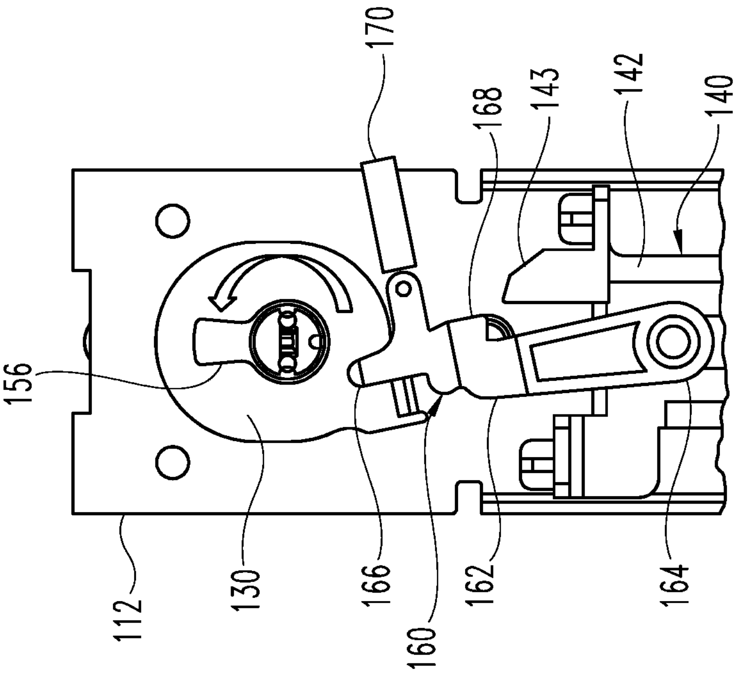

In FIG. 9D, the key is re-inserted into interior lock cylinder assembly 300, and plug 304 and cam lobe 314 are rotated 180 degrees counterclockwise to contact locking arm 160 at second end 166, and pivot locking arm 166 about first end 164 to move blocking portion 168 back into the path of flange 143 of driving piece 142 of lift finger assembly 140. The exterior lock cylinder assembly 150 and its mortise cam 156 are not rotated and remain at 0 degrees. In certain embodiment, interior lock cylinder assembly 300 includes a thumbturn.

Referring to FIGS. 10-19C, another embodiment locking mechanism 92' is shown that is similar locking mechanism 90 discussed above, but further includes a spring biasing mechanism 350 mounted in exterior trim 100, as discussed further below. In addition, device cam 312 is replaced with a floating cam 352 that is configured to operate with lost motion in conjunction with spring biasing mechanism 350. Locking mechanism 92' provides a night-latch (NL) function for manual actuator 120 using exterior lock cylinder assembly 150, and a locking function for manual actuator 120 using interior lock cylinder assembly 300. As used herein, the night latch function allows the trim key to be used with exterior lock cylinder assembly 150 to momentarily unlock the manual actuator 120 to allow entry, but when the trim key is released, the manual actuator 120 is automatically locked. Like components with locking mechanism 92 discussed above are labelled with the same reference numerals.

Figure 11B:
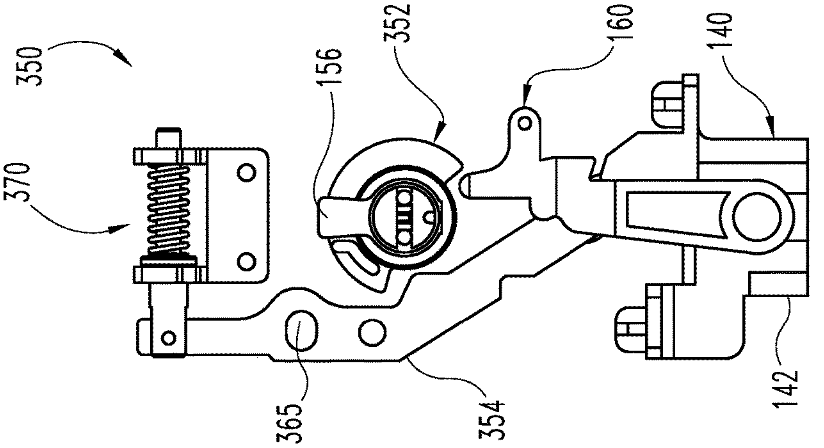
FIGS. 11A and 11B are an interior side elevation view and an exterior side elevation view, respectively, of a portion of the exterior trim locking and unlocking mechanism of the embodiment of FIG. 10.
Figure 11A:
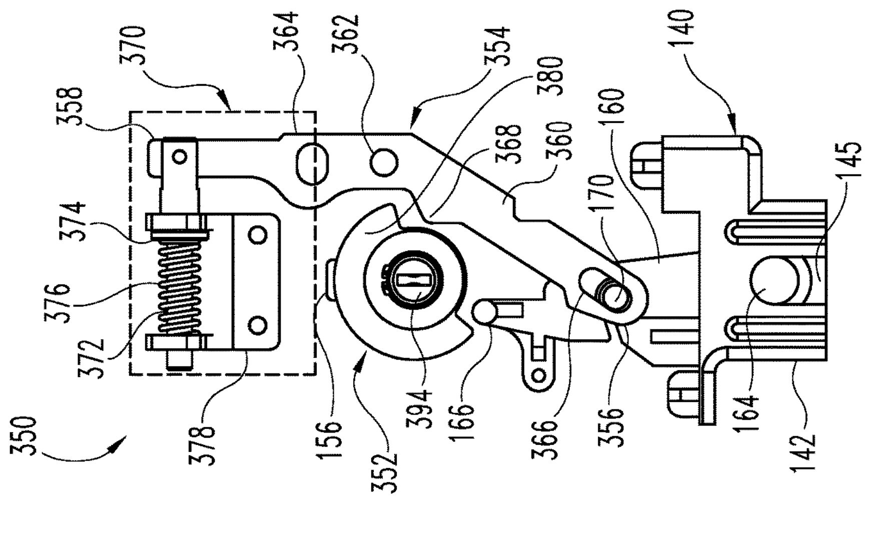

Further details of spring biasing mechanism 350 are shown in FIGS. 11A-11B. Spring biasing mechanism 350 includes a pivot arm 354 that extends from a first end 356 to a second end 358. First end 356 includes a slot 366 that is connected to a pin 170 located toward mi-length of locking arm 160. Pivot arm 354 includes a first body portion 360 that extends from first end 356 to a pivot pin 362. Pivot arm 354 includes a second body portion 364 angled relative to first body portion 360. Second body portion 364 extends from pivot pin 362 to second end 358. Pivot pin 362 can be engaged to exterior trim 100. Body portion 364 may also include a slot 365 that receives a translation pin on exterior trim 100 to maintain the desired positioning of pivot arm 354 within exterior trim 100.

Second end 358 of pivot arm 354 is engaged to a spring arm assembly 370. Spring arm assembly 370 includes a rod 372 having a flange 374, a spring 376 around rod 372, and a holder 378 mounted to exterior trim 100. Rod 372 is pivotally coupled at one end thereof to second end 358, and extends through holder 378 to an opposite end. Spring 376 is positioned within holder 378, and spring 376 abuts flange 374 at one end of spring 376 and holder 378 at an opposite end of spring 376. Spring 376 biases pivot arm 354 to the position shown in FIGS. 11A and 11B, and compresses in response to pivoting of locking arm 160 via mortise cam 156 or pivoting of pivot arm 354 by floating cam 352, as discussed further below.

Figure 13:
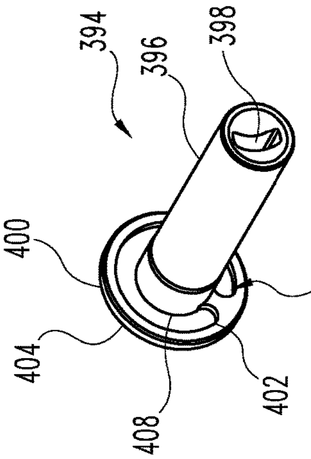
FIG. 13 is a perspective view of a device cam of the floating cam for the interior lock cylinder assembly for the interior center case of FIG. 10.
Figure 12:
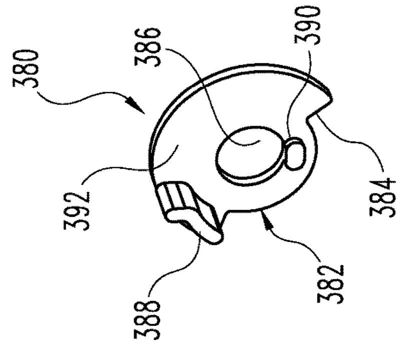
FIG. 12 is a perspective view of a trim lock cam of a floating cam for the interior lock cylinder assembly for the interior center case of FIG. 10.

Further details of floating cam 352 are shown in FIGS. 12-13. Floating cam 352 includes a trim lock cam 380 and a device cam 394. Trim lock cam 380 has a circular body 382 with a central hole 386 for receiving cylindrical post 396 of device cam 394. Circular body 382 includes a radial protruding part 384 extending partially around body 382, and an axial protrusion 388 at one end of the radial protruding part 384. Body 382 also includes an outer face 392 that is oriented toward exterior trim 100, and face 392 includes a stop member 390 projecting outwardly therefrom.

Device cam 394 includes an inner passage 398 along post 396 that receives tailpiece 306 of interior lock cylinder assembly 300, allowing floating cam 352 to be rotated by interior lock cylinder assembly 300. Device cam 394 also includes an end flange 400 with an inner face 402 and an outer face 404. Inner face 402 includes an annular groove 408 formed therein and an abutment 406 that interrupts groove 408. Stop member 390 of trim lock cam 380 is positioned in groove 408. Trim lock cam 380 is therefore rotatable relative to device cam 394 so long as stop member 390 rotates in groove 408, and trim lock cam 380 and device cam 394 rotate together when stop member 390 is rotated to contact abutment 406 and is continued to be rotated in the same direction.

Figure 14:
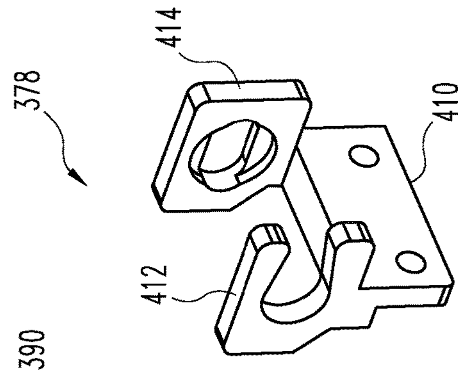
FIG. 14 is a perspective view of a spring holder of the spring biasing mechanism of FIGS. 11A and 11B.

Holder 378 is shown in FIG. 14. Holder 378 includes a mounting part 410 mounted to trim plate 112. Holder 378 also includes a first bracket 412 and a second bracket 414 spaced from first bracket 412, and first and second brackets 412, 414 extend outwardly from mounting part 410. First bracket 412 includes an open side to allow rod 372 to be side-loaded into first bracket 412 with flange 374 located between brackets 412, 414 and positioned against first bracket 412. The opposite end of rod 372 extends through the enclosed hole of second bracket 414. Spring 376 is positioned between brackets 412, 414 against flange 374 and the second bracket 414, as shown in FIGS. 11A-11B.

Figure 16:
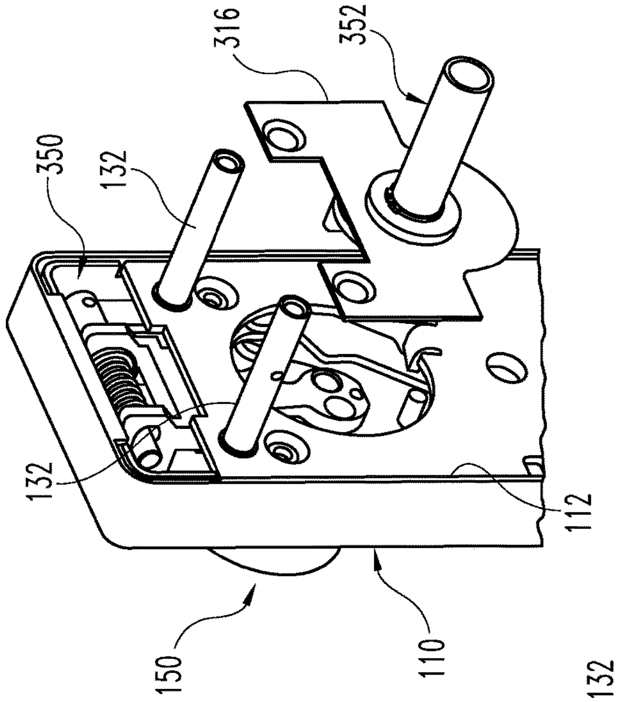
FIGS. 16-17 are exploded perspective views showing mounting of the floating cam of the interior lock cylinder assembly relative to the interior side of the exterior trim.
Figure 17:
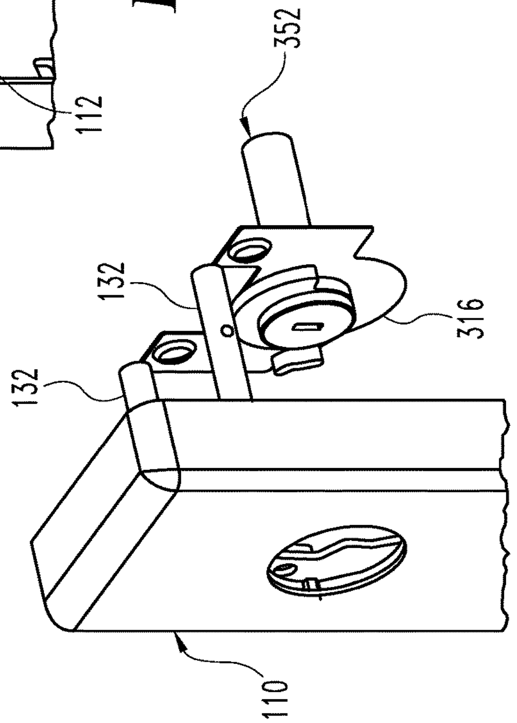
Figure 15:
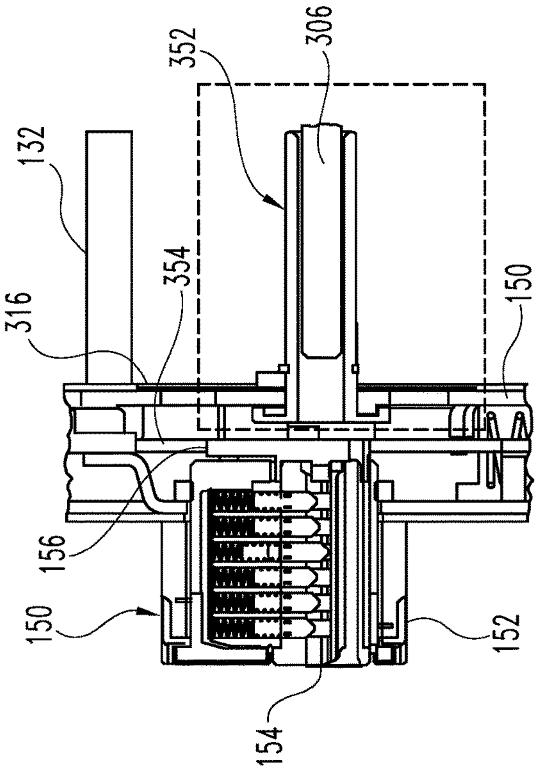
FIG. 15 is a section view of showing a portion of the interior lock cylinder assembly and the exterior lock cylinder assembly of the embodiment of FIG. 10 mounted to the interior trim.

FIGS. 15-17 show the mounting of floating cam 352 to exterior trim 100 with cam mounting bracket 316. Cam mounting bracket 316 is positioned on trim rods 132 and against an inner facing (toward the door) surface of trim plate 112. Trim lock cam 380 extends through trim plate opening 130 so it can contact pivot arm 354 in exterior trim 100. In addition, mortise cam 156 can contact locking arm 160 and is axially aligned with floating cam 352.

Figure 18A:
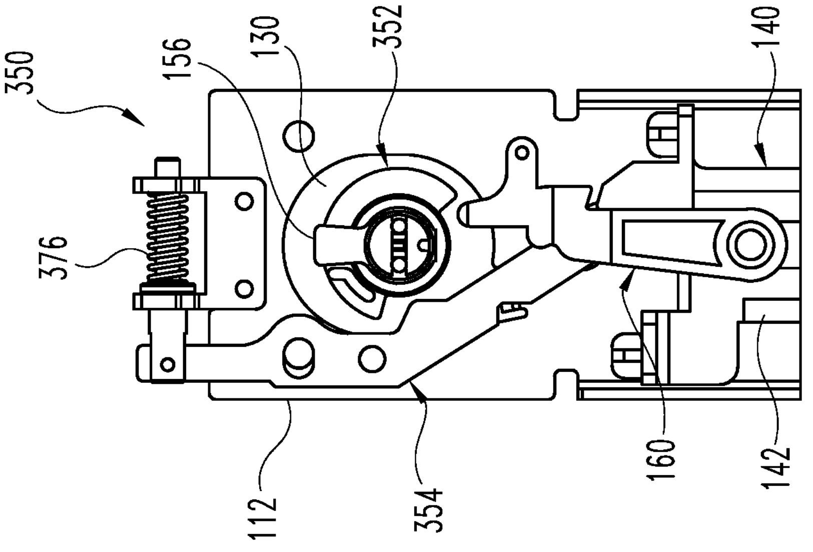
FIGS. 18A-18C illustrate various positions relating to operation of the exterior lock cylinder assembly that provide locked and unlocked states of the exterior trim.
Figure 18B:
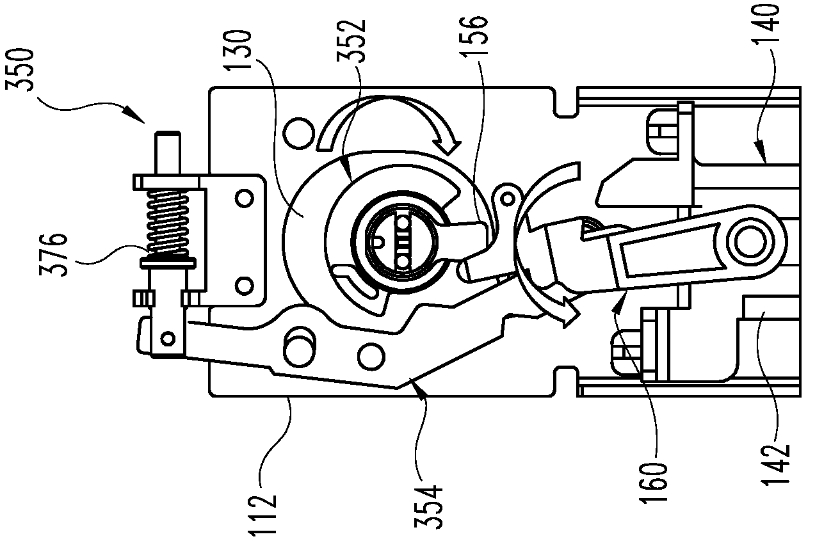
Figure 18C:
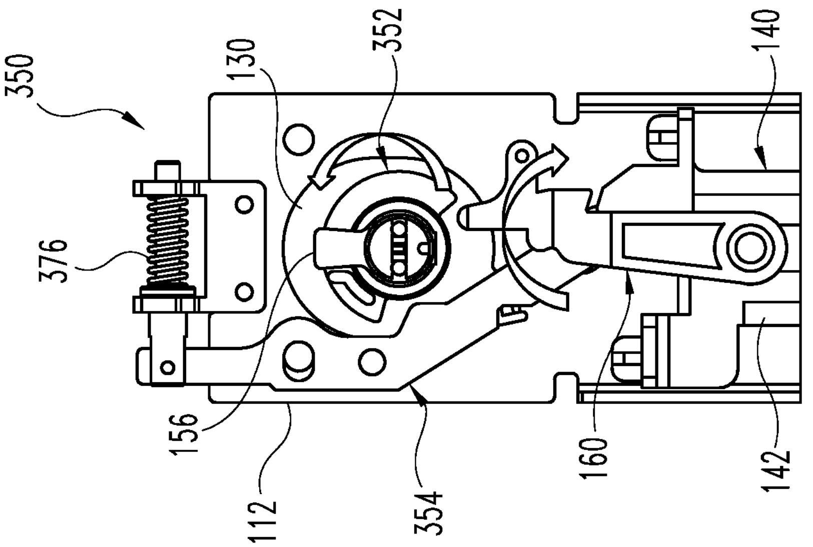

FIGS. 18A-18C show the night latch function for manual actuator 120 using exterior lock cylinder assembly 150. In FIG. 18A, the trim key is not present in plug 154, and locking arm 160 is positioned at a 0 degree position and over flange 143 of lift finger assembly 140 so that the manual actuator 120 is locked. The mortise cam 156 is also at 0 degrees, and the trim locking cam 380 and device cam 394 of floating cam 352 are also at 0 degrees.

In FIG. 18B, the key is inserted into exterior lock cylinder assembly 150, and mortise cam 156 is rotated 180 degrees clockwise to contact locking arm 160 and rotate or pivot locking arm 160 from its locked position. As a result, flange 143 of lift finger assembly 140 is no longer blocked by blocking portion 168 of locking arm 160, and manual actuator 120 can be used to actuate latch mechanism 240. The trim locking cam 380 and device cam 394 of floating cam 352 remain at 0 degrees.

As further shown in FIG. 18B, the spring biasing mechanism 350 is activated by locking arm 160 pivoting pivot arm 354 to compress spring 376. As a result, the key is used to hold locking arm 160 in the unlocked position against the return force of spring 376 in order to actuate manual actuator 120 to actuate latch mechanism 240 to open the door 80 with the exterior trim 100.

In FIG. 18C, the key is released and/or removed from exterior lock cylinder assembly 150. Spring 376 acts against the second end 358 of pivot arm 354, causing pivot arm 354 to pivot and rotate locking arm 160 back to its locked position relative to flange 143. The mortise cam 156, as well as the trim locking cam 380 and device cam 394 of floating cam 352, are all at 0 degrees.

Figures 19A, 19B, 19C:
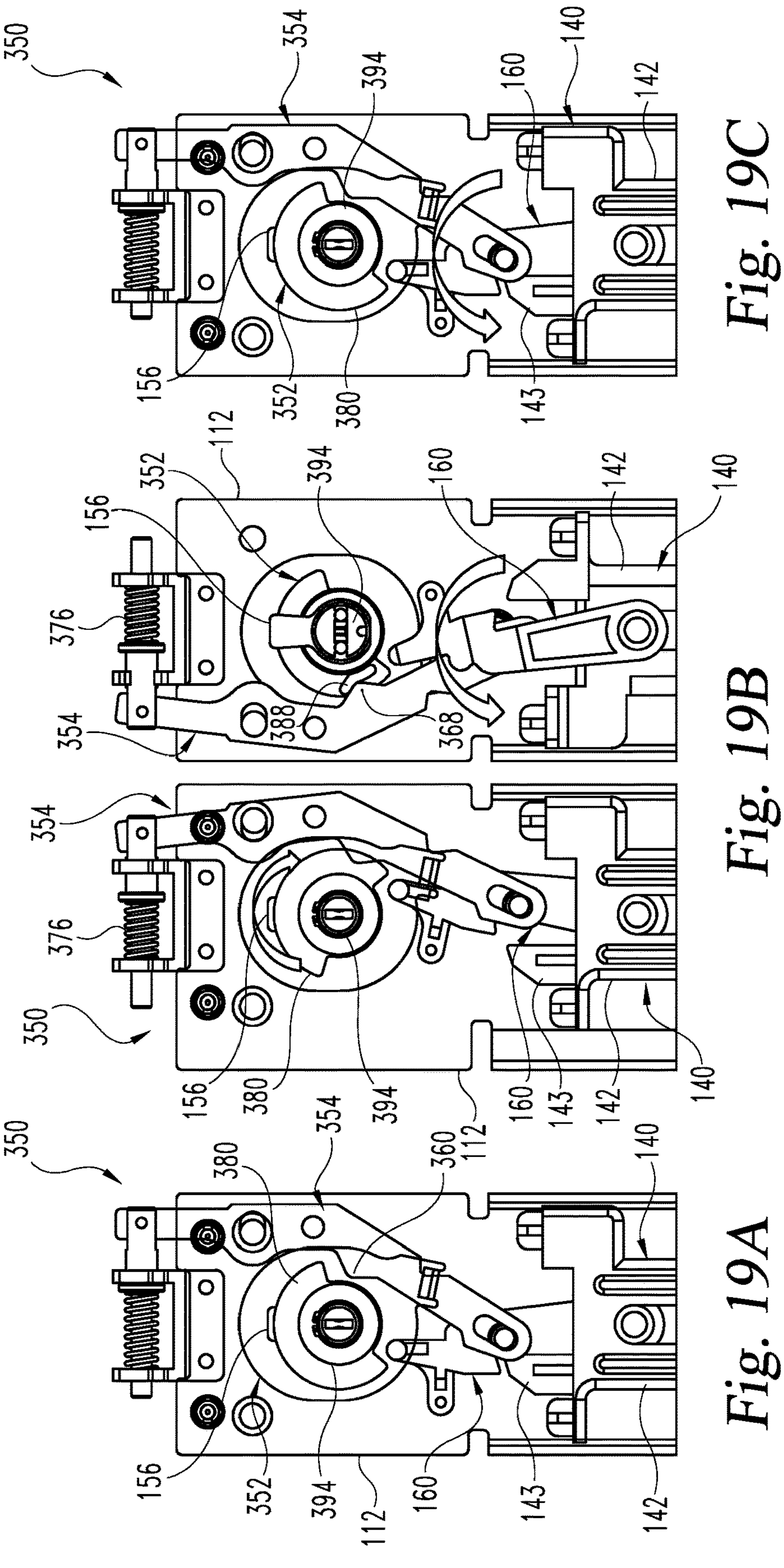
FIGS. 19A-19C illustrate various positions relating to operation of the interior lock cylinder assembly that provide locked and unlocked states of the exterior trim.

FIGS. 19A-19C show the lock-unlock function for manual actuator 120 using interior lock cylinder assembly 300. In FIG. 19A, the interior key is not present in plug 304, and locking arm 160 is positioned at a 0 degree position over flange 143 of lift finger assembly 140 so that the manual actuator 120 is locked. The mortise cam 156 is also at 0 degrees, as well as the trim locking cam 380 and device cam 394 of floating cam 352.

In FIG. 19B, the key is inserted into interior lock cylinder assembly 300, and device cam 394 is rotated 360 degrees in the clockwise direction (when looking into exterior trim 100 from the egress side 82 of door 80) in order to rotate trim lock cam 380 sixty degrees. Axial protrusion 388 of trim lock cam 380 contacts pivot arm projection 368 on first body portion 360 near the junction with second body portion 364. This contact, along with the configuration of axial protrusion 388 relative to projection 368, causes pivot arm 354 to pivot and compress spring 376, while simultaneously rotating locking arm 60 twelve degrees from its locked position. As a result, flange 143 of lift finger assembly 140 is no longer blocked by locking arm 160, and manual actuator 120 can be used to actuate latch mechanism 240. The mortise cam 156 remains at 0 degrees. Device cam 394 is locked in position by interior lock cylinder assembly 300 to prevent counter-rotation of trim lock cam 380. Manual actuator 120 can therefore be maintained in an unlocked position with interior lock cylinder assembly 300.

In FIG. 19C, interior lock cylinder assembly 300 is rotated to displace device cam 394 360 degrees in the counterclockwise direction, which rotates trim lock cam 380 sixty degrees in the counterclockwise direction, disengaging trim lock cam 380 from pivot arm 354. Spring 376 acts against the second end 358 of pivot arm 354, causing pivot arm 354 to pivot and rotate locking arm 160 back to its locked position relative to flange 143. The mortise cam 156, as well as the trim locking cam 380 and device locking cam 394 of floating cam 352, are all at 0 degrees in the FIG. 189 position.

Various aspects and embodiments of the present disclosure are contemplated. According to one aspect, an exit device assembly for mounting to an ingress side and an egress side of a door is provided. The exit device assembly includes a pushbar assembly configured for mounting to the egress side of the door. The pushbar assembly includes a pushbar for movement between a projected position and a depressed position and a latch control assembly operably connected with the pushbar and a latch mechanism such that the movement of the pushbar from the projected position to the depressed position moves the latch control assembly from a deactuated state to an actuated state that actuates the latch mechanism. The exit device assembly also includes an exterior trim configured for mounting to the ingress side of the door. The exterior trim includes a manual actuator that is operably connected to one of the latch control assembly and the latch mechanism actuate the latch mechanism from the deactuated state to the actuated state. The exit device assembly also includes an exterior lock cylinder assembly mounted on the exterior trim. The exterior lock cylinder assembly is configured to rotate between a first position in which the manual actuator is prevented from being operated to actuate the latch mechanism and a second position in which the exterior lock cylinder assembly enables manual actuator to be operated to actuate the latch mechanism. The exit device assembly further includes an interior lock cylinder assembly mounted on the pushbar assembly. The interior lock cylinder assembly is configured to rotate between a first position in which the manual actuator is prevented from being operated to actuate the latch mechanism and a second position in which the interior lock cylinder assembly enables the manual actuator to be operated to actuate the latch mechanism.

In embodiment, the exterior lock cylinder assembly is configured to receive a key, the interior lock cylinder assembly is configured to receive a key or includes a thumbturn, and when the key inserted in the interior lock cylinder assembly and/or the exterior lock cylinder assembly, the key enables the corresponding lock cylinder assembly to be rotated between the first and second positions.

In embodiment, a lift finger assembly is connected to the manual actuator. The manual actuator is operable to vertically displace the lift finger assembly in order to actuate the latch mechanism.

In embodiment, a locking arm is pivotally mounted in the exterior trim. The locking arm is pivotal by operation of each of the interior lock cylinder assembly and the exterior lock cylinder assembly from a locked position in which the locking arm is positioned to block vertical displacement of the lift finger assembly to an unlocked position in which the locking arm does not block vertical displacement of the lift finger assembly.

In an embodiment, the locking arm includes an elongated body extending from a first end pivotally mounted to the exterior trim to an opposite outer second end. The outer second end is selectively engageable by the interior lock cylinder assembly and exterior lock cylinder assembly to pivot the locking arm between the locked position and the unlocked position.

In embodiment, the exterior lock cylinder assembly includes a mortise cam that rotates with rotation of the exterior lock cylinder assembly. With the locking arm in the locked position, the exterior lock cylinder assembly is rotated in a first direction to contact the mortise cam with the second end of the locking arm to pivot the locking arm from the locked position to the unlocked position.

In embodiment, with exterior lock cylinder assembly rotated in the first direction to move the locking arm to the unlocked position with the mortise cam, the exterior lock cylinder assembly is rotated 360 degrees in a second direction opposite the first direction to contact the mortise cam with the second end of the locking arm to pivot the locking arm from the unlocked position to the locked position.

In embodiment, the interior lock cylinder assembly includes a device cam that rotates with rotation of the interior lock cylinder assembly. With the locking arm in the locked position, the interior lock cylinder assembly is rotated in the first direction to contact the device cam with the second end of the locking arm to pivot the locking arm from the locked position to the unlocked position.

In embodiment, with interior lock cylinder assembly rotated in the first direction to move the locking arm to the unlocked position with the device cam, the interior lock cylinder assembly is rotated 360 degrees in the second direction to contact the device cam with the second end of the locking arm to pivot the locking arm from the unlocked position to the locked position.

In embodiment, the interior lock cylinder assembly and the exterior lock cylinder assembly are rotatable about a common rotation axis extending through the interior lock cylinder assembly and the exterior lock cylinder assembly.

In embodiment, the interior lock cylinder assembly includes an outer cylindrical shell mounted to a center case of the pushbar assembly, a plug rotatable within the shell, a tailpiece extending axially from the plug, and a floating cam assembly engaged to the tailpiece. The floating cam assembly is rotatable with rotation of the plug in the shell between the first position and the second position.

In embodiment, the floating cam assembly includes a device cam mounted on the tailpiece, and a trim lock cam mounted on and rotatable relative to the device cam.

In embodiment, a locking arm is pivotally mounted in the exterior trim. The locking arm is pivotal by operation of each of the interior lock cylinder assembly and the exterior lock cylinder assembly from a locked position in which the locking arm is positioned to prevent the manual actuator from being operated to actuate the latch mechanism and an unlocked position in which the manual actuator is enabled to be operated to actuate the latch mechanism.

In embodiment, a pivot arm is connected to the locking arm and pivotally coupled to the exterior trim. The exterior lock cylinder assembly acts on the locking arm to pivot the locking arm between the locked and unlocked positions, and the interior lock cylinder assembly acts on the pivot arm to pivot the locking arm between the locked and unlocked positions.

In embodiment, the pivot arm extends between a first end and an opposite second end, the first end is connected to the locking arm, and the second end is connected to a spring biasing mechanism that biases the locking arm to the locked position.

In embodiment, the spring biasing mechanism includes a rod pivotally connected to the second end of the pivot arm, the rod including a flange and a holder mounted to the exterior trim. The holder included a first bracket and a second bracket spaced from the first bracket, and the rod extends through the first and second brackets. A spring extends around the rod between the first and second brackets. The spring extends between and contacts one of the first and second brackets and the flange on the rod.

In embodiment, a lift finger assembly is connected to the manual actuator. The manual actuator is operable to vertically displace a driving piece of the lift finger assembly in order to actuate the latch mechanism with a driven piece of the lift finger assembly. In the locked position, the locking arm is positioned to block movement of the driving piece and in the unlocked position the locking arm is moved out of a path of movement of the driving piece.

In embodiment, the locking arm includes a locking arm body that extends between a first end pivotally mounted to the exterior trim and an opposite outer second end. The locking arm body include a laterally projecting blocking portion between the first and second ends that blocks movement of the driving piece of the lift finger assembly in the locked position of the locking arm.

In embodiment, the driving piece includes a slot and the second end of the locking arm is pivotally connected to the exterior trim through the slot, and the slot translates along the second end of the locking arm as the driving piece is driven by the manual actuator.

In embodiment, the exterior lock cylinder assembly is configured as a night latch for the manual actuator and the interior lock cylinder assembly is configured to lock and unlock the manual actuator.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An exit device assembly for mounting to an ingress side and an egress side of a door, the exit device assembly comprising:

a pushbar assembly configured for mounting to the egress side of the door, the pushbar assembly including a pushbar for movement between a projected position and a depressed position and a latch control assembly operably connected with the pushbar and a latch mechanism such that the movement of the pushbar from the projected position to the depressed position moves the latch control assembly from a deactuated state to an actuated state that actuates the latch mechanism;

an exterior trim configured for mounting to the ingress side of the door, the exterior trim including a manual actuator that is operably connected to one of the latch control assembly and the latch mechanism actuate the latch mechanism from the deactuated state to the actuated state;

an exterior lock cylinder assembly mounted on the exterior trim, the exterior lock cylinder assembly being configured to rotate between a first position in which the manual actuator is prevented from being operated to actuate the latch mechanism and a second position in which the exterior lock cylinder assembly enables manual actuator to be operated to actuate the latch mechanism;

an interior lock cylinder assembly mounted on the pushbar assembly, the interior lock cylinder assembly being configured to rotate between a first position in which the manual actuator is prevented from being operated to actuate the latch mechanism and a second position in which the interior lock cylinder assembly enables the manual actuator to be operated to actuate the latch mechanism;

a locking arm mounted in the exterior trim that is movable by operation of each of the interior lock cylinder assembly and the exterior lock cylinder assembly; and a pivot arm in the exterior trim that is connected to the locking arm, wherein the locking arm is biased to a locked position in which the manual actuator is prevented from being operated to actuate the latch mechanism;

wherein the exterior lock cylinder assembly acts on the locking arm to pivot the locking arm between the locked and position and an unlocked position, and the interior lock cylinder assembly acts on the pivot arm to pivot the locking arm between the locked position and the unlocked position.

2. The exit device assembly of claim 1, wherein the exterior lock cylinder assembly is configured to receive a key, the interior lock cylinder assembly is configured to receive a key or includes a thumbturn, and when the key inserted in the interior lock cylinder assembly and/or the exterior lock cylinder assembly, the key enables the corresponding lock cylinder assembly to be rotated between the first and second positions.

3. The exit device assembly of claim 1, further comprising a lift finger assembly connected to the manual actuator, wherein the manual actuator is operable to vertically displace the lift finger assembly in order to actuate the latch mechanism.

4. The exit device assembly of claim 3, wherein the locking arm is pivotally mounted in the exterior trim, wherein the locking arm is pivotal by operation of each of the interior lock cylinder assembly and the exterior lock cylinder assembly from the locked position in which the locking arm is positioned to block vertical displacement of the lift finger assembly to the unlocked position in which the locking arm does not block vertical displacement of the lift finger assembly.

5. The exit device assembly of claim 4, wherein the locking arm includes an elongated body extending from a first end pivotally mounted to the exterior trim to an opposite outer second end, the outer second end being selectively engageable by the interior lock cylinder assembly and exterior lock cylinder assembly to pivot the locking arm between the locked position and the unlocked position.

6. The exit device assembly of claim 5, wherein:

the exterior lock cylinder assembly includes a mortise cam that rotates with rotation of the exterior lock cylinder assembly, wherein with the locking arm in the locked position, the exterior lock cylinder assembly is rotated in a first direction to contact the mortise cam with the second end of the locking arm to pivot the locking arm from the locked position to the unlocked position.

7. The exit device assembly of claim 6, wherein:

with exterior lock cylinder assembly rotated in the first direction to move the locking arm to the unlocked position with the mortise cam, the exterior lock cylinder assembly is rotated 360 degrees in a second direction opposite the first direction to contact the mortise cam with the second end of the locking arm to pivot the locking arm from the unlocked position to the locked position.

8. The exit device assembly of claim 5, wherein:

the interior lock cylinder assembly includes a device cam that rotates with rotation of the interior lock cylinder assembly, wherein with the locking arm in the locked position, the interior lock cylinder assembly is rotated in the first direction to contact the device cam with the second end of the locking arm to pivot the locking arm from the locked position to the unlocked position.

9. The exit device assembly of claim 8, wherein:

with interior lock cylinder assembly rotated in the first direction to move the locking arm to the unlocked position with the device cam, the interior lock cylinder assembly is rotated 360 degrees in the second direction to contact the device cam with the second end of the locking arm to pivot the locking arm from the unlocked position to the locked position.

10. The exit device assembly of claim 1, wherein the interior lock cylinder assembly and the exterior lock cylinder assembly are rotatable about a common rotation axis extending through the interior lock cylinder assembly and the exterior lock cylinder assembly.

11. The exit device assembly of claim 1, wherein the interior lock cylinder assembly includes:

an outer cylindrical shell mounted to a center case of the pushbar assembly;

a plug rotatable within the shell;

a tailpiece extending axially from the plug; and a floating cam assembly engaged to the tailpiece, the floating cam assembly rotatable with rotation of the plug in the shell between the first position and the second position.

12. The exit device assembly of claim 11, wherein the floating cam assembly includes:

a device cam mounted on the tailpiece; and a trim lock cam mounted on and rotatable relative to the device cam.

13. The exit device assembly of claim 1, wherein the locking arm is pivotally mounted in the exterior trim, wherein the locking arm is pivotal by operation of each of the interior lock cylinder assembly and the exterior lock cylinder assembly from the locked position in which the locking arm is positioned to prevent the manual actuator from being operated to actuate the latch mechanism and the unlocked position in which the manual actuator is enabled to be operated to actuate the latch mechanism.

14. The exit device assembly of claim 13, wherein the pivot arm is pivotally coupled to the exterior trim, wherein the exterior lock cylinder assembly acts on the locking arm to pivot the locking arm between the locked and unlocked positions, and the interior lock cylinder assembly acts on the pivot arm to pivot the locking arm between the locked and unlocked positions.

15. The exit device assembly of claim 13, further comprising a lift finger assembly connected to the manual actuator, wherein the manual actuator is operable to vertically displace a driving piece of the lift finger assembly in order to actuate the latch mechanism with a driven piece of the lift finger assembly, wherein in the locked position the locking arm is positioned to block movement of the driving piece and in the unlocked position the locking arm is moved out of a path of movement of the driving piece.

16. The exit device assembly of claim 1, wherein the exterior lock cylinder assembly is configured as a night latch for the manual actuator and the interior lock cylinder assembly is configured to lock and unlock the manual actuator.

17. An exit device assembly for mounting to an ingress side and an egress side of a door, the exit device assembly comprising:

a pushbar assembly configured for mounting to the egress side of the door, the pushbar assembly including a pushbar for movement between a projected position and a depressed position and a latch control assembly operably connected with the pushbar and a latch mechanism such that the movement of the pushbar from the projected position to the depressed position moves the latch control assembly from a deactuated state to an actuated state that actuates the latch mechanism;

an exterior trim configured for mounting to the ingress side of the door, the exterior trim including a manual actuator that is operably connected to one of the latch control assembly and the latch mechanism actuate the latch mechanism from the deactuated state to the actuated state;

an exterior lock cylinder assembly mounted on the exterior trim, the exterior lock cylinder assembly being configured to rotate between a first position in which the manual actuator is prevented from being operated to actuate the latch mechanism and a second position in which the exterior lock cylinder assembly enables manual actuator to be operated to actuate the latch mechanism;

an interior lock cylinder assembly mounted on the pushbar assembly, the interior lock cylinder assembly being configured to rotate between a first position in which the manual actuator is prevented from being operated to actuate the latch mechanism and a second position in which the interior lock cylinder assembly enables the manual actuator to be operated to actuate the latch mechanism;

a locking arm pivotally mounted in the exterior trim, wherein the locking arm is pivotal by operation of each of the interior lock cylinder assembly and the exterior lock cylinder assembly from a locked position in which the locking arm is positioned to prevent the manual actuator from being operated to actuate the latch mechanism and an unlocked position in which the manual actuator is enabled to be operated to actuate the latch mechanism; and a pivot arm connected to the locking arm and pivotally coupled to the exterior trim, wherein the exterior lock cylinder assembly acts on the locking arm to pivot the locking arm between the locked and unlocked positions, and the interior lock cylinder assembly acts on the pivot arm to pivot the locking arm between the locked and unlocked positions, wherein:

the pivot arm extends between a first end and an opposite second end;

the first end is connected to the locking arm; and the second end is connected to a spring biasing mechanism that biases the locking arm to the locked position.

18. The exit device assembly of claim 17, wherein the spring biasing mechanism includes:

a rod pivotally connected to the second end of the pivot arm, the rod including a flange;

a holder mounted to the exterior trim, the holder including a first bracket and a second bracket spaced from the first bracket, the rod extending through the first and second brackets; and a spring around the rod between the first and second brackets, wherein the spring extends between and contacts one of the first and second brackets and the flange on the rod.

19. The exit device assembly of claim 17, wherein the locking arm includes a locking arm body that extends between a first end pivotally mounted to the exterior trim and an opposite outer second end, wherein the locking arm body include a laterally projecting blocking portion between the first and second ends that blocks movement of the driving piece of the lift finger assembly in the locked position of the locking arm.

20. The exit device assembly of claim 19, wherein the driving piece includes a slot and the second end of the locking arm is pivotally connected to the exterior trim through the slot, and the slot translates along the second end of the locking arm as the driving piece is driven by the manual actuator.

* * * * *